(12) United States Patent
Oshima et al.

(10) Patent No.: US 12,744,237 B2
(45) Date of Patent: Sep. 22, 2026

(54) SOLID ELECTROLYTE COMPOSITION, METHOD FOR MANUFACTURING SOLID ELECTROLYTE SHEET, AND METHOD FOR MANUFACTURING BATTERY

(71) Applicant: Panasonic Intellectual Property Management Co., Ltd., Osaka (JP)

(72) Inventors: Tatsuya Oshima, Osaka (JP); Yusuke Nishio, Osaka (JP); Seiji Nishiyama, Osaka (JP); Kazufumi Miyatake, Osaka (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 621 days.

(21) Appl. No.: 18/058,921

(22) Filed: Nov. 28, 2022

(65) Prior Publication Data

US 2023/0094818 A1 Mar. 30, 2023

Related U.S. Application Data

(63) Continuation of application No. PCT/JP2021/022959, filed on Jun. 16, 2021.

(30) Foreign Application Priority Data

Jun. 23, 2020 (JP) ................................ 2020-107996

(51) Int. Cl.
*H01M 10/0562* (2010.01)

(52) U.S. Cl.
CPC .. *H01M 10/0562* (2013.01); *H01M 2300/008* (2013.01)

(58) Field of Classification Search
CPC .................... H01M 10/0562; H01M 2300/008
See application file for complete search history.

(56) References Cited

U.S. PATENT DOCUMENTS 5,190,695 A 3/1993 Sotomura
2010/0151335 A1* 6/2010 Senga ................ H01M 10/052 429/322

(Continued)

FOREIGN PATENT DOCUMENTS

CN 111211356 A 5/2020
EP 3736828 A1 11/2020

(Continued)

OTHER PUBLICATIONS

The EPC Office Action dated Sep. 26, 2024 for the related European Patent Application No. 21829498.1.

(Continued)

*Primary Examiner* — Michael N Orlando
(74) *Attorney, Agent, or Firm* — WHDA, LLP

(57) ABSTRACT

A solid electrolyte composition includes a solvent and a solid electrolyte dispersed in the solvent. The solid electrolyte includes a halide solid electrolyte. The solvent has a polar component δp of Hansen solubility parameters that is greater than 0 and less than 5.9. The halide solid electrolyte contains Li, M1, and X1. M1 is at least one selected from the group consisting of metalloid elements and metal elements other than Li. X1 is at least one selected from the group consisting of F, Cl, Br, and I.

13 Claims, 3 Drawing Sheets

(56) References Cited

U.S. PATENT DOCUMENTS

| | | | | |
|---|---|---|---|---|
| 2016/0329539 | A1* | 11/2016 | Kawaji | H01M 10/052 |
| 2018/0277892 | A1* | 9/2018 | Mimura | H01M 4/0404 |
| 2018/0351159 | A1* | 12/2018 | Fujiki | H01M 4/134 |
| 2019/0088995 | A1* | 3/2019 | Asano | H01M 10/0562 |

FOREIGN PATENT DOCUMENTS

| | | | |
|---|---|---|---|
| EP | 3736830 | A1 | 11/2020 |
| EP | 3745422 | A1 | 12/2020 |
| JP | 4-033254 | | 2/1992 |
| JP | 2019-102412 | | 6/2019 |
| WO | 2015/151144 | A1 | 10/2015 |

OTHER PUBLICATIONS

International Search Report of PCT application No. PCT/JP2021/022959 dated Aug. 31, 2021.

* cited by examiner

SOLID ELECTROLYTE COMPOSITION, METHOD FOR MANUFACTURING SOLID ELECTROLYTE SHEET, AND METHOD FOR MANUFACTURING BATTERY

BACKGROUND

1. Technical Field

The present disclosure relates to a solid electrolyte composition, a method for manufacturing a solid electrolyte sheet, and a method for manufacturing a battery.

2. Description of the Related Art

Japanese Unexamined Patent Application Publication No. 2019-102412 discloses a solid electrolyte composition including a sulfide solid electrolyte and a solvent. The solid electrolyte composition used includes a solvent having a polar component δp of the Hansen solubility parameters (HSP) that is greater than or equal to 1.6 and is less than or equal to 5.6.

SUMMARY

The related art needs improvement in surface smoothness of a solid electrolyte sheet to enable a battery having a high energy density.

In one general aspect, the techniques disclosed here feature a solid electrolyte composition including a solvent and a solid electrolyte dispersed in the solvent. The solid electrolyte includes a halide solid electrolyte. The solvent has a polar component δp of Hansen solubility parameters that is greater than 0 and less than 5.9. The halide solid electrolyte contains Li, M1, and X1. M1 is at least one selected from the group consisting of metalloid elements and metal elements other than Li. X1 is at least one selected from the group consisting of F, Cl, Br, and I.

The present disclosure can provide a solid electrolyte sheet having high surface smoothness and can provide a battery including the solid electrolyte sheet and having a high energy density.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
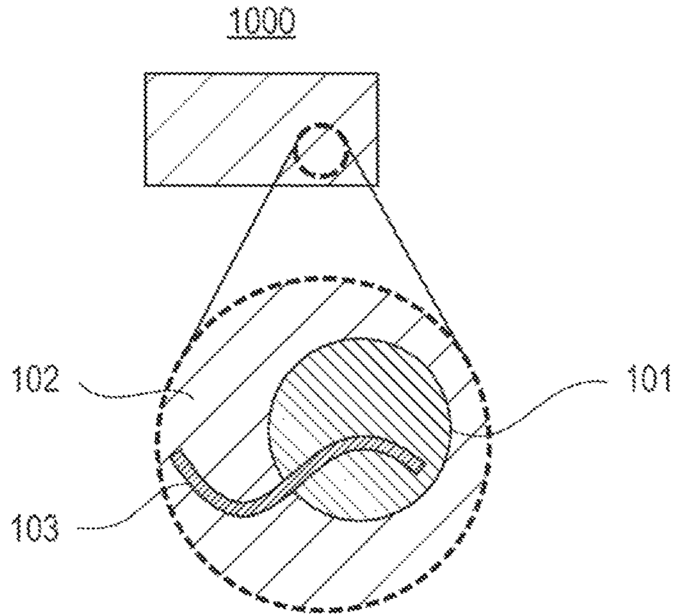
FIG. 1 is a schematic diagram of a solid electrolyte composition 1000, according to a first embodiment.

Underlying Knowledge Forming Basis of the Present Disclosure

The field of secondary batteries of the related art predominantly uses an organic electrolyte solution obtained by dissolving an electrolyte salt in an organic solvent. Secondary batteries that use an organic electrolyte solution present a concern for liquid leakage. Another issue that has been discussed is the large amount of heat that is generated if short-circuiting or the like occurs.

On the other hand, all-solid-state secondary batteries, which use an inorganic solid electrolyte instead of an organic electrolyte solution, are attracting attention. All-solid-state secondary batteries are free from liquid leakage. In addition, the high thermal stability of the inorganic solid electrolyte is expected to inhibit heat generation that may occur when short-circuiting or the like occurs.

Known inorganic solid electrolytes include sulfide solid electrolytes, which contain sulfur as a major component, and oxide solid electrolytes, which contain a metal oxide as a major component. Sulfide solid electrolytes may generate hydrogen sulfide, which is toxic, when the sulfide solid electrolytes react with water. Oxide solid electrolytes have low ionic conductivity. Accordingly, there is a need for the development of a new solid electrolyte having high ionic conductivity.

One new solid electrolyte that appears promising is a halide solid electrolyte. Halide solid electrolytes are solid electrolytes containing a halogen element. For example, a halide solid electrolyte contains elemental lithium, a metal or metalloid element, and at least one halogen element.

Practical use of an all-solid-state secondary battery that includes a solid electrolyte requires preparation of a solid electrolyte composition that contains a solid electrolyte and that is flowable. A coat of the solid electrolyte composition is applied to, for example, a surface of an electrode or a substrate to form a solid electrolyte sheet. The solid electrolyte sheet serves as a separator of a battery. Improving the energy density of a battery requires reducing a thickness of the solid electrolyte sheet that serves as a separator, while preventing contact between a positive electrode and a negative electrode.

Reducing a thickness of the solid electrolyte sheet used as a separator requires a sufficient surface smoothness of the solid electrolyte sheet. When the solid electrolyte sheet has a high surface roughness, the solid electrolyte sheet has large thickness variations. Reliably preventing contact between the positive electrode and the negative electrode requires a certain thickness at all positions of the solid electrolyte sheet.

Accordingly, in instances where large thickness variations are anticipated, it is not appropriate, from the standpoint of safety, to reduce the design thickness. In other words, in instances where the solid electrolyte sheet has excellent surface smoothness and small thickness variations, safety can be ensured even if the design thickness is reduced. Furthermore, in instances where the solid electrolyte sheet has a smooth surface, improvement in the battery characteristics due to improvement in adhesion between the electrodes and the solid electrolyte sheet can be expected. Accordingly, there is a need for a technology for forming a solid electrolyte sheet that has excellent surface smoothness and that is thin.

Preparation of a solid electrolyte composition that is flowable requires mixing of a solid electrolyte with an organic solvent. The present inventors prepared solid electrolyte compositions by mixing a halide solid electrolyte with various organic solvents and produced solid electrolyte sheets with the solid electrolyte compositions, to examine the surface smoothness of the solid electrolyte sheets. As a result, it was found that in instances where certain organic solvents are mixed with a halide solid electrolyte, the flowability of the solid electrolyte compositions is degraded, which leads to low surface smoothness of the solid electrolyte sheets. For example, in some instances, an organic solvent suitable for a sulfide solid electrolyte is not suitable for a halide solid electrolyte. These observations led to the idea of the configuration of the present disclosure.

Overview of Aspects of the Present Disclosure

According to a First Aspect of the Present Disclosure, a Solid Electrolyte Composition Includes a solvent; and a solid electrolyte dispersed in the solvent, the solid electrolyte including a halide solid electrolyte, in which the solvent has a polar component δp of Hansen solubility parameters that is greater than 0 and less than 5.9, the halide solid electrolyte contains Li, M1, and X1, M1 is at least one selected from the group consisting of metalloid elements and metal elements other than Li, and X1 is at least one selected from the group consisting of F, Cl, Br, and I.

In instances where a solid electrolyte sheet is manufactured with the solid electrolyte composition according to the first aspect, the resulting solid electrolyte sheet has excellent surface smoothness. Solid electrolyte sheets having excellent surface smoothness can improve the energy density of batteries. In instances where the solid electrolyte includes a lithium-containing halide solid electrolyte, a resulting solid electrolyte sheet can be used in the manufacture of lithium secondary batteries.

In a second aspect of the present disclosure, the solid electrolyte composition according to the first aspect may be one in which, for example, the solvent has a polar component δp of the Hansen solubility parameters that is greater than or equal to 0.6 and less than or equal to 5.7.

In instances where a solid electrolyte sheet is manufactured with the solid electrolyte composition according to the second aspect, the resulting solid electrolyte sheet has enhanced surface smoothness. Solid electrolyte sheets having excellent surface smoothness can improve the energy density of batteries.

In a third aspect of the present disclosure, the solid electrolyte composition according to the first aspect may be one in which, for example, the halide solid electrolyte is represented by composition formula (1) below, where α, β, and γ are each independently a value greater than 0. With regard to the third aspect, the halide solid electrolyte has improved ionic conductivity, and, consequently, a solid electrolyte sheet manufactured from the solid electrolyte composition can have improved ionic conductivity.

$$Li_{\alpha}M1_{\beta}X1_{\gamma} \quad \text{formula (1)}$$

In a fourth aspect of the present disclosure, the solid electrolyte composition according to the first or third aspect may be one in which, for example, M1 includes yttrium. With regard to the fourth aspect, the halide solid electrolyte has improved ionic conductivity, and, consequently, a solid electrolyte sheet manufactured from the solid electrolyte composition can have improved ionic conductivity.

In a fifth aspect of the present disclosure, the solid electrolyte composition according to any one of the first to fourth aspects may be one that, for example, further includes a resin binder. Resin binders improve the dispersibility of solid electrolytes in solvents and adhesion between particles of the solid electrolytes.

In a sixth aspect of the present disclosure, the solid electrolyte composition according to the fifth aspect may be one in which, for example, the resin binder includes an elastomer. Elastomers have excellent flexibility and elasticity and are, therefore, suitable as a resin binder for a solid electrolyte sheet.

In a seventh aspect of the present disclosure, the solid electrolyte composition according to the sixth aspect may be one in which, for example, the elastomer includes repeating units derived from styrene. Elastomers including repeating units derived from styrene have enhanced flexibility and elasticity and are, therefore, particularly suitable as a resin binder for a solid electrolyte sheet.

According to an eighth aspect of the present disclosure, a method for manufacturing a solid electrolyte sheet includes applying the solid electrolyte composition according to any one of the first to seventh aspects to an electrode or a substrate to form a coated film; and removing the solvent from the coated film.

With regard to the eighth aspect, a solid electrolyte sheet that is homogeneous and has a uniform thickness can be manufactured.

According to a ninth aspect of the present disclosure, a method for manufacturing a battery is a method for manufacturing a battery including a positive electrode, a negative electrode, and an electrolyte layer disposed between the positive electrode and the negative electrode, and the method includes providing a solid electrolyte sheet manufactured by the method according to the eighth aspect; and combining the positive electrode with the negative electrode in a manner such that the solid electrolyte sheet is disposed between the positive electrode and the negative electrode to serve as the electrolyte layer.

With regard to the ninth aspect, a battery having a high energy density can be manufactured.

According to a tenth aspect of the present disclosure, a solid electrolyte sheet includes a halide solid electrolyte; and a resin binder in contact with the halide solid electrolyte, in which the halide solid electrolyte contains Li, M1, and X1, M1 is at least one selected from the group consisting of metalloid elements and metal elements other than Li, X1 is at least one selected from the group consisting of F, Cl, Br, and I, the solid electrolyte sheet has a thickness of greater than or equal to 1 μm and less than or equal to 20 μm, and a major surface of the solid electrolyte sheet has an arithmetic mean height Sa of less than or equal to 0.37 μm.

The solid electrolyte sheet according to the tenth aspect has excellent surface smoothness. Solid electrolyte sheets having excellent surface smoothness can improve the energy density of batteries.

According to an Eleventh Aspect of the Present Disclosure, a Battery Includes a positive electrode;

a negative electrode; and an electrolyte layer disposed between the positive electrode and the negative electrode, the electrolyte layer including the solid electrolyte sheet according to the tenth aspect.

The battery according to the eleventh aspect can have a high energy density.

Embodiments of the present disclosure will now be described with reference to the drawings. The present disclosure is not limited to the embodiments described below.

First Embodiment

FIG. 1 is a schematic diagram of a solid electrolyte composition 1000, according to a first embodiment. The solid electrolyte composition 1000 includes a solid electrolyte 101 and a solvent 102. The solid electrolyte 101 is dispersed or dissolved in the solvent 102. The solid electrolyte 101 includes a halide solid electrolyte. Regarding the solvent 102, the solvent 102 has a polar component δp of the Hansen solubility parameters (HSP) that is greater than 0 and less than 5.9.

In instances where a solid electrolyte sheet is manufactured with the solid electrolyte composition 1000, the resulting solid electrolyte sheet has excellent surface smoothness. Solid electrolyte sheets having excellent surface smoothness can improve the energy density of batteries.

The solid electrolyte 101 includes a halide solid electrolyte. The halide solid electrolyte contains, for example, Li, M1, and X1. M1 is at least one selected from the group consisting of metalloid elements and metal elements other than Li, and X1 is at least one selected from the group consisting of F, Cl, Br, and I. In instances where the solid electrolyte 101 includes a lithium-containing halide solid electrolyte, a resulting solid electrolyte sheet can be used in the manufacture of lithium secondary batteries.

The present inventors studied solid electrolyte compositions including a solid electrolyte and a solvent. As a result, the present inventors found that in instances where a halide solid electrolyte is mixed with a solvent having a polar component δp of the HSP that is 5.9 or greater, a flowability of the solid electrolyte composition is degraded, and, consequently, a problem arises in that a solid electrolyte sheet manufactured from the solid electrolyte composition has low surface smoothness. It is believed that the problem is caused by a strong interaction between a halide solid electrolyte and a solvent having a high polarity. More specifically, halide solid electrolytes have bonding sites having a high degree of ionic bonding, such as M1-X1 bonding sites. A solvent having a polar component δp of the HSP that is 5.9 or greater is a solvent having a relatively high degree of uneven distribution of charge. It is believed that the problem described above arises because of a strong interaction between the bonding sites having a high degree of ionic bonding of the halide solid electrolyte and the solvent having a high degree of uneven distribution of charge.

The present inventors further found that in instances where a halide solid electrolyte is mixed with a solvent having a polar component δp of the HSP that is 0, the flowability of the solid electrolyte composition is also degraded, and, consequently, a problem arises in that a solid electrolyte sheet manufactured from the solid electrolyte composition has low surface smoothness. It is believed that the problem is caused by a strong interaction between particles of the halide solid electrolyte. More specifically, halide solid electrolytes have bonding sites having a high degree of ionic bonding, such as M1-X1 bonding sites. A solvent having a polar component δp of the HSP that is 0 is a solvent having a relatively low degree of uneven distribution of charge. It is believed that the problem described above arises because the strong interaction between particles due to the bonding sites having a high degree of ionic bonding of the halide solid electrolyte cannot be mitigated by a solvent having a low degree of uneven distribution of charge.

It is believed that the phenomenon is unlikely to occur at bonding sites having a high degree of covalent bonding, such as the P—S bonding present in sulfide solid electrolytes and the M-O bonding present in oxide solid electrolytes. That is, it is believed that the problems described above are unique to halide solid electrolytes.

The present inventors performed further studies based on the above-described findings. As a result, it was found that by controlling the polarity of the solvent, specifically, by using a solvent having a polar component δp of the HSP that is a value greater than 0 and less than 5.9, it is possible to inhibit the phenomenon of degradation in the flowability of a solid electrolyte composition including a halide solid electrolyte. As described above, in the solid electrolyte composition 1000, the polar component δp of the HSP of the solvent 102 is a value greater than 0 and less than 5.9. As a result, a solid electrolyte sheet manufactured from the solid electrolyte composition 1000 can have improved surface smoothness.

The polar component δp of the HSP of the solvent 102 may be greater than or equal to 0.6 and less than or equal to 5.7. In this case, in instances where a solid electrolyte sheet is manufactured from the solid electrolyte composition 1000, the resulting solid electrolyte sheet has enhanced surface smoothness. Solid electrolyte sheets having excellent surface smoothness can improve the energy density of batteries.

Furthermore, the polar component δp may be greater than or equal to 0.6 and less than or equal to 5.0.

As long as bonding sites having a high degree of ionic bonding, such as M—X bonding sites, are present, there is a possibility that the problems described above may arise. Accordingly, the application range of the technology of the present disclosure is not limited to a halide solid electrolyte having a specific composition. The technology of the present disclosure can be widely applied to solid electrolyte compositions 1000 containing a halide solid electrolyte.

The solid electrolyte sheet may be a free-standing sheet member or a solid electrolyte layer supported on an electrode or a substrate.

The solid electrolyte composition 1000 may be a slurry that is flowable. When the solid electrolyte composition 1000 is flowable, solid electrolyte sheets can be formed with a wet process, such as a coating process.

The solid electrolyte 101 may include a solid electrolyte other than a halide solid electrolyte. Examples of such a solid electrolyte include sulfide solid electrolytes and oxide solid electrolytes. Alternatively, the solid electrolyte 101 may be a halide solid electrolyte. In other words, the solid electrolyte 101 may include only a halide solid electrolyte.

The solid electrolyte composition 1000 may further include a resin binder 103 (which may hereinafter also be referred to as a "binder 103"). The resin binder 103 is dispersed or dissolved in the solvent 102. The resin binder 103 can improve a flexibility of the solid electrolyte sheet that is to be obtained. Solid electrolyte sheets having excellent flexibility can easily adhere to an electrode. Accordingly, resistance between the solid electrolyte sheet and the electrode can be reduced.

In the present disclosure, the "metalloid elements" are B, Si, Ge, As, Sb, and Te.

In the present disclosure, the "metal elements" are all the elements other than hydrogen from Groups 1 to 12 of the periodic table and all the elements other than B, Si, Ge, As, Sb, Te, C, N, P, O, S and Se from Groups 13 to 16 of the periodic table.

In the present disclosure, the "metalloid elements" and the "metal elements" are elements that can become a cation in instances in which the element forms an inorganic compound with a halogen element.

Now, the solid electrolyte composition 1000 of the first embodiment will be described in detail. In the following description, the solid electrolyte 101 may be referred to as a "halide solid electrolyte".

In the present disclosure, the "halide solid electrolyte" refers to a solid electrolyte containing a halogen element and not containing sulfur. In the present disclosure, the "solid electrolyte not containing sulfur" refers to a solid electrolyte represented by a composition formula that does not include the element sulfur. Accordingly, solid electrolytes containing a very small amount of a sulfur component, which may be, for example, solid electrolytes having a sulfur content of less than or equal to 0.1 mass %, are classified as solid electrolytes not containing sulfur. The halide solid electrolyte may contain an anion of oxygen in addition to the anion of the halogen element.

Solid Electrolyte Composition

The solid electrolyte composition 1000 of the first embodiment includes the halide solid electrolyte 101, the solvent 102, and the resin binder 103. The halide solid electrolyte 101, the solvent 102, and the resin binder 103 will be described in detail below.

Halide Solid Electrolyte

The halide solid electrolyte 101 is a material containing Li, M1, and X1. The element M1 and the element X1 are as described above. With this configuration, the halide solid electrolyte 101 has further improved ionic conductivity, and, therefore, a solid electrolyte sheet manufactured from the solid electrolyte composition 1000 can have further improved ionic conductivity. Accordingly, in instances where the solid electrolyte sheet is used in a battery, the solid electrolyte sheet can improve the power characteristics of the battery. Furthermore, the halide solid electrolyte 101 has high thermal stability, and, therefore, in instances where a solid electrolyte sheet manufactured from the solid electrolyte composition 1000 is used in a battery, the solid electrolyte sheet can improve the safety of the battery. Furthermore, since the halide solid electrolyte 101 does not contain sulfur, a solid electrolyte sheet manufactured from the solid electrolyte composition 1000 can inhibit the generation of a hydrogen sulfide gas.

The halide solid electrolyte 101 may be a material represented by composition formula (1) below. In composition formula (1), $\alpha$, $\beta$, and $\gamma$ are each independently a value greater than 0. $\gamma$ may be, for example, 4 or 6.

$$Li_{\alpha}M1_{\beta}X1_{\gamma} \quad \text{formula (1)}$$

With this configuration, the halide solid electrolyte 101 has improved ionic conductivity, and, consequently, a solid electrolyte sheet manufactured from the solid electrolyte composition 1000 can have improved ionic conductivity. Accordingly, in instances where the solid electrolyte sheet is used in a battery, the solid electrolyte sheet can further improve the power characteristics of the battery.

In composition formula (1), the element M1 may include Y (=yttrium). That is, the halide solid electrolyte 101 may contain Y as a metal element.

The halide solid electrolyte 101 containing Y may be represented, for example, by composition formula (2) below.

$$Li_aMe_bY_cX_6 \quad \text{formula (2)}$$

In composition formula (2), a, b, and c may satisfy a+mb+3c=6 and c>0. The element Me is at least one selected from the group consisting of metalloid elements and metal elements other than Li or Y. m represents the valence of the element Me. Note that when the element Me includes two or more elements, mb is the sum of the values obtained by multiplying the compositional ratio of each of the elements by the valence of the element. For example, in instances where Me includes an element Me1 and an element Me2, and when the compositional ratio of the element Me1 is $b_1$, the valence of the element Me1 is $m_1$, the compositional ratio of the element Me2 is $b_2$, and the valence of the element Me2 is M2, $mb=m_1b_1+m_2m_2$. In composition formula (2), the element X is at least one selected from the group consisting of F, Cl, Br, and I.

The element Me may be, for example, at least one selected from the group consisting of Mg, Ca, Sr, Ba, Zn, Sc, Al, Ga, Bi, Zr, Hf, Ti, Sn, Ta, Gd, and Nb.

The halide solid electrolyte 101 may be any of the following materials, for example. With any of the following materials, the halide solid electrolyte 101 has further improved ionic conductivity, and, consequently, a solid electrolyte sheet manufactured from the solid electrolyte composition 1000 of the first embodiment can have further improved ionic conductivity. Accordingly, in instances where the solid electrolyte sheet is used in a battery, the solid electrolyte sheet can further improve the power characteristics of the battery.

The halide solid electrolyte 101 may be a material represented by composition formula (A1) below.

$$Li_{6-3d}Y_dX1_6 \quad \text{formula (A1)}$$

In composition formula (A1), the element X1 is at least one selected from the group consisting of Cl, Br, and I. In composition formula (A1), d satisfies 0<d<2.

The halide solid electrolyte 101 may be a material represented by composition formula (A2) below.

$$Li_3YX1_6 \quad \text{formula (A2)}$$

In composition formula (A2), the element X1 is at least one selected from the group consisting of Cl, Br, and I.

The halide solid electrolyte 101 may be a material represented by composition formula (A3) below.

$$Li_{3-3\delta}Y_{1+\delta}Cl_6 \quad \text{formula (A3)}$$

In composition formula (A3), $\delta$ satisfies $0<\delta\leq0.15$.

The halide solid electrolyte 101 may be a material represented by composition formula (A4) below.

$$Li_{3-3\delta}Y_{1+\delta}Br_6 \quad \text{formula (A4)}$$

In composition formula (A4), $\delta$ satisfies $0<\delta\leq0.25$.

The halide solid electrolyte 101 may be a material represented by composition formula (A5) below.

$$Li_{3-3\delta+a}Y_{1+\delta-a}Me_aCl_{6-x-y}Br_xI_y \quad \text{formula (A5)}$$

In composition formula (A5), the element Me is at least one selected from the group consisting of Mg, Ca, Sr, Ba, and Zn.

Furthermore, in composition formula (A5), the following relationships are satisfied:

$-1<\delta<2$, $0<a<3$, $0<(3-3\delta+a)$, $0<(1+\delta-a)$, $0\leq x\leq 6$, $0\leq y\leq 6$, and $(x+y)\leq 6$.

The halide solid electrolyte 101 may be a material represented by composition formula (A6) below.

$$Li_{3-3\delta}Y_{1+\delta-a}Me_aCl_{6-x-y}Br_xI_y \quad \text{formula (A6)}$$

In composition formula (A6), the element Me is at least one selected from the group consisting of Al, Sc, Ga, and Bi.

Furthermore, in composition formula (A6), the following relationships are satisfied:

$-1<\delta<1$, $0<a<2$, $0<(1+\delta-a)$, $0\leq x\leq 6$, $0\leq y\leq 6$, and $(x+y)\leq 6$.

The halide solid electrolyte 101 may be a material represented by composition formula (A7) below.

$$Li_{3-3\delta-a}Y_{1+\delta-a}Me_aCl_{6-x-y}Br_xI_y \quad \text{formula (A7)}$$

In composition formula (A7), the element Me is at least one selected from the group consisting of Zr, Hf, and Ti.

Furthermore, in composition formula (A7), the following relationships are satisfied:

$-1<\delta<1$, $0<a<1.5$, $0<(3-3\delta-a)$, $0<(1+\delta-a)$, $0\leq x\leq 6$, $0\leq y\leq 6$, and $(x+y)\leq 6$.

The halide solid electrolyte 101 may be a material represented by composition formula (A8) below.

$$Li_{3-3\delta-2a}Y_{1+\delta-a}Me_aCl_{6-x-y}Br_xI_y \quad \text{formula (A8)}$$

In composition formula (A8), the element Me is at least one selected from the group consisting of Ta and Nb.

Furthermore, in composition formula (A8), the following relationships are satisfied:

$-1<\delta<1$, $0<a<1.2$, $0<(3-3\delta-2a)$, $0<(1+\delta-a)$, $0\leq x\leq 6$, $0\leq y\leq 6$, and $(x+y)\leq 6$.

The halide solid electrolyte 101 may be a compound containing Li, M2, O (oxygen), and X2. The element M2 includes, for example, at least one selected from the group consisting of Nb and Ta. Furthermore, X2 is at least one selected from the group consisting of F, Cl, Br, and I.

The compound containing Li, M2, X2, and O (oxygen) may be represented, for example, by a composition formula of $Li_xM2O_yX2_{5+x-2y}$. In the formula, x may satisfy $0.1<x<7.0$, and y may satisfy $0.4<y<1.9$.

More specific examples of the halide solid electrolyte 101 include $Li_3YX3_6$, $Li_2MgX3_4$, $Li_2FeX3_4$, Li(Al, Ga, In)$X3_4$, $Li_3$(Al, Ga, In)$X3_6$, $Li_3$(Ca, Y, Gd)$X3_6$, $Li_3$(Ti, Al)$X3_6$, $Li_{2.7}$(Ti, Al)$X3_6$, and $LiTaOCl_4$. In these materials, the element X3 is at least one selected from the group consisting of F, Cl, Br, and I. Note that in the present disclosure, regarding the elements in formulae, expressions such as "(Al, Ga, In)" mean at least one element selected from the group of the elements in the parenthesis. That is, "(Al, Ga, In)" has the same meaning as "at least one selected from the group consisting of Al, Ga, and In". The same applies to other elements.

Furthermore, a shape of the halide solid electrolyte 101 is not particularly limited and may be, for example, a needle shape, a spherical shape, an ellipsoidal shape, or the like. For example, the shape of the halide solid electrolyte 101 may be a particle shape.

When the shape of the halide solid electrolyte 101 is a particle shape (e.g., a spherical shape), the solid electrolyte may have a particle diameter (median diameter) of greater than or equal to 1 μm and less than or equal to 100 μm or greater than or equal to 1 μm and less than or equal to 10 μm. When the halide solid electrolyte 101 has a particle diameter of greater than or equal to 1 μm and less than or equal to 100 μm, the halide solid electrolyte 101 can be easily dispersed in the solvent 102.

When the shape of the halide solid electrolyte 101 is a particle shape (e.g., a spherical shape), the solid electrolyte may have a particle diameter of greater than or equal to 0.1 μm and less than or equal to 1 μm. When the halide solid electrolyte 101 has a particle diameter of greater than or equal to 0.1 μm and less than or equal to 1 μm, a solid electrolyte sheet manufactured from the solid electrolyte composition 1000 can have higher surface smoothness and a denser structure.

The median diameter is a particle diameter corresponding to a cumulative volume of 50% in a volume-based particle size distribution. The volume-based particle size distribution can be obtained, for example, by using a laser diffraction light scattering method. The same applies to the other materials described below.

Now, a method for manufacturing the halide solid electrolyte 101 will be described. Here, an example of a method for manufacturing a halide solid electrolyte represented by composition formula (1), shown above, will be described.

First, several types of raw material powders of binary halides are prepared in accordance with the target composition. The "binary halide" is a compound formed of two elements including a halogen element. For example, when $Li_3YCl_6$ is to be produced, a raw material powder of $LiC_1$ and a raw material powder of $YCl_3$ are prepared in a molar ratio of 3:1. In this instance, the elemental species of M and X of composition formula (1) can be determined by the selection of the types of the raw material powders. Furthermore, the values of α, β, and γ of composition formula (1) can be adjusted by adjusting the types of the raw material powders, the compounding ratio between the raw material powders, and the synthesis process.

After the raw material powders are mixed together and milled, the raw material powders are caused to react with each other by using a mechanochemical milling method. Alternatively, after the raw material powders are mixed together and milled, the raw material powders may be heat-treated in a vacuum or in an inert atmosphere. For example, the heat treatment may be carried out in a range of 100° C. to 550° C. for 1 hour or more. Any of these methods can produce the halide solid electrolyte represented by composition formula (1), shown above.

Solvent

The solvent 102 may have a polar component δp of the HSP that is greater than or equal to 0.6 and less than or equal to 5.7. When the polar component δp is less than or equal to 5.7, the solid electrolyte composition 1000 can have good flowability, and, consequently, a solid electrolyte sheet manufactured from the solid electrolyte composition 1000 can have improved surface smoothness. When the polar component δp is greater than or equal to 0.6, the solid electrolyte 101 can exhibit good dispersibility, and, therefore, a solid electrolyte sheet manufactured from the solid electrolyte composition 1000 can have further improved surface smoothness.

The Hansen solubility parameters (HSP) are a set of parameters that can define solubility parameters of a solvent. The HSP is composed of a dispersion component od, a polar component δp, and a hydrogen-bonding component δh. The polar component δp is a parameter correlated to a dielectric constant and a dipole moment of a solvent and, therefore, indicates the degree of uneven distribution of charge. There are existing HSP databases. For example, a database included in a program such as Hansen Solubility Parameters in Practice (HSPiP) can be referred to, to obtain the HSP values of a solvent. The HSP of a mixed solvent including two or more solvents can be expressed as the sum of values of the solvents, which are values determined by multiplying the HSP of each of the solvents by a volume fraction of the solvent.

The solvent 102 may be an organic solvent. The organic solvent is a carbon-containing compound, and examples of the elements present in the compound include carbon, hydrogen, nitrogen, oxygen, sulfur, and halogens.

The solvent 102 may include at least one selected from the group consisting of a hydrocarbon, a halogen-group-containing compound, and an ether-bond-containing compound.

The hydrocarbon is a compound composed only of carbon and hydrogen. The hydrocarbon may be an aliphatic hydrocarbon. The hydrocarbon may be a saturated hydrocarbon or an unsaturated hydrocarbon. The hydrocarbon may be linear or branched. The number of carbon atoms present in the hydrocarbon is not particularly limited and may be greater than or equal to 7. In the instance where a hydrocarbon is used, the resulting solid electrolyte composition 1000 has excellent dispersibility for the solid electrolyte 101. Furthermore, a decrease in ionic conductivity of the solid electrolyte 101 due to the mixing with the solvent 102 can be inhibited.

The hydrocarbon may have a ring structure. The ring structure may be that of an alicyclic hydrocarbon or that of an aromatic hydrocarbon. The ring structure may be a monocyclic structure or a polycyclic structure. In the instance where the hydrocarbon has a ring structure, the halide solid electrolyte 101 can be easily dispersed in the solvent 102. The hydrocarbon may include an aromatic hydrocarbon so that the dispersibility of the halide solid electrolyte 101 in the solid electrolyte composition 1000 can be enhanced. The hydrocarbon may be an aromatic hydrocarbon.

In the halogen-group-containing compound, the portion other than the halogen group may be formed only of carbon and hydrogen. That is, the halogen-group-containing compound is a compound in which at least one of the hydrogen atoms present in the hydrocarbon is replaced with a halogen group. Examples of the halogen group include F, Cl, Br, and I. The halogen group may be at least one selected from the group consisting of F, Cl, Br, and I. Halogen-group-containing compounds can have a high polarity. In the instance where a halogen-group-containing compound is used in the solvent 102, the halide solid electrolyte 101 can be easily dispersed in the solvent 102, and, therefore, the resulting solid electrolyte composition 1000 has excellent dispersibility. As a result, a solid electrolyte sheet manufactured from the solid electrolyte composition 1000 can have excellent ionic conductivity and a denser structure.

The number of carbon atoms present in the halogen-group-containing compound is not particularly limited and may be greater than or equal to 7. In such cases, the halogen-group-containing compound does not easily volatilize, and, therefore, consistent manufacturing of the solid electrolyte composition 1000 can be achieved. Furthermore, the halogen-group-containing compound can have a high molecular weight. That is, the halogen-group-containing compound can have a high boiling point.

The halogen-group-containing compound may have a ring structure. The ring structure may be that of an alicyclic hydrocarbon or that of an aromatic hydrocarbon. The ring structure may be a monocyclic structure or a polycyclic structure. In the instance where the halogen-group-containing compound has a ring structure, the halide solid electrolyte 101 can be easily dispersed in the solvent 102. The halogen-group-containing compound may include an aromatic hydrocarbon so that the dispersibility of the halide solid electrolyte 101 in the solid electrolyte composition 1000 can be enhanced. The halogen-group-containing compound may be an aromatic hydrocarbon.

In the halogen-group-containing compound, the halogen group may be the only functional group. In this instance, the number of halogens present in the halogen-group-containing compound is not particularly limited. The halogen group may be at least one selected from the group consisting of F, Cl, Br, and I. In the instance where such a compound is used in the solvent 102, the halide solid electrolyte 101 can be easily dispersed in the solvent 102, and, therefore, the resulting solid electrolyte composition 1000 has excellent dispersibility. As a result, a solid electrolyte sheet manufactured from the solid electrolyte composition 1000 can have excellent ionic conductivity and a denser structure. In the instance where such a compound is used in the solvent 102, a solid electrolyte sheet manufactured from the solid electrolyte composition 1000 can easily have a dense structure with reduced pinholes, irregularities, and the like.

The halogen-group-containing compound may be a halogenated hydrocarbon. The halogenated hydrocarbon is a compound in which all of the hydrogen atoms present in the hydrocarbon are replaced with a halogen group. In the instance where a halogenated hydrocarbon is used in the solvent 102, the halide solid electrolyte 101 can be easily dispersed in the solvent 102, and, therefore, the resulting solid electrolyte composition 1000 has excellent dispersibility. As a result, a solid electrolyte sheet manufactured from the solid electrolyte composition 1000 can have excellent ionic conductivity and a denser structure. In the instance where such a compound is used in the solvent 102, a solid electrolyte sheet manufactured from the solid electrolyte composition 1000 can, for example, easily have a dense structure with reduced pinholes, irregularities, and the like.

In the ether-bond-containing compound, the portion other than the ether bond may be formed only of carbon and hydrogen. That is, the ether-bond-containing compound is a compound in which at least one of the C—C bonds present in the hydrocarbon is replaced with a C—O—C bond. Ether-bond-containing compounds can have a high polarity. In the instance where an ether-bond-containing compound is used in the solvent 102, the halide solid electrolyte 101 can be easily dispersed in the solvent 102. Accordingly, the resulting solid electrolyte composition 1000 has excellent dispersibility. As a result, a solid electrolyte sheet manufactured from the solid electrolyte composition 1000 can have excellent ionic conductivity and a denser structure.

The ether-bond-containing compound may have a ring structure. The ring structure may be that of an alicyclic hydrocarbon or that of an aromatic hydrocarbon. The ring structure may be a monocyclic structure or a polycyclic structure. In the instance where the ether-bond-containing compound has a ring structure, the halide solid electrolyte 101 can be easily dispersed in the solvent 102. The ether-bond-containing compound may include an aromatic hydrocarbon so that the dispersibility of the halide solid electrolyte 101 in the solid electrolyte composition 1000 can be enhanced. The ether-bond-containing compound may be an aromatic hydrocarbon.

Examples of the solvent 102 include ethyl benzene ($\delta p=0.6$), mesitylene ($\delta p=0.6$), pseudocumene ($\delta=1.0$), o-xylene ($\delta=1.0$), p-xylene ($\delta=1.0$), cumene ($\delta=1.2$), toluene ($\delta=1.4$), tetralin ($\delta=2.0$), m-xylene ($\delta=2.6$), dibutyl ether ($\delta=3.4$), 1,2,4-trichlorobenzene ($\delta p=4.2$), chlorobenzene ($\delta p=4.3$), 2,4-dichlorotoluene ($\delta p=4.3$), anisole ($\delta p=4.4$), o-chlorotoluene ($\delta p=4.9$), m-dichlorobenzene ($\delta p=5.1$), p-chlorotoluene ($\delta p=6.2$), o-dichlorobenzene ($\delta=6.3$), 1,4-dichlorobutane ($\delta=7.7$), and 3,4-dichlorotoluene ($\delta=9.8$). These may be used alone or in a combination of two or more.

From the standpoint of cost, commercially available xylene (mixed xylene) may be selected as the solvent 102. For example, mixed xylene ($\delta=1.6$) including o-xylene, m-xylene, p-xylene, and ethyl benzene that are mixed together in a mass ratio of 24:42:18:16 may be used.

The solvent 102 may have a boiling point of greater than or equal to 100° C. and less than or equal to 250° C. The solvent 102 may be a liquid at room temperature (25° C.). Such a solvent does not easily volatilize at room temperature, and, therefore, consistent manufacturing of the solid electrolyte composition 1000 can be achieved. Accordingly, the resulting solid electrolyte composition 1000 can be easily applied to a surface of an electrode or a substrate. Furthermore, the solvent 102 present in the solid electrolyte composition 1000 can be easily removed by drying, which will be described later.

The solvent 102 may have a water content of less than or equal to 10 mass-ppm. The reduced water content inhibits a decrease in ionic conductivity due to a reaction of the solid electrolyte 101. Examples of methods for reducing the water content include dehydration methods that use a molecular sieve and dehydration methods that use bubbling of an inert gas, such as a nitrogen gas or an argon gas. Dehydration methods that use bubbling of an inert gas are recommended because, with such a method, oxygen can be removed together with water. The water content can be measured with a Karl Fischer moisture analyzer.

The solvent 102 may be a liquid in which the halide solid electrolyte 101 can be dispersed. The halide solid electrolyte 101 need not be dissolved int the solvent 102. In the instance where the halide solid electrolyte 101 is not dissolved, the solid electrolyte composition 1000 that is produced can be in a state in which an ion-conducting phase formed during the manufacture of the halide solid electrolyte 101 is retained. Consequently, a decrease in the ionic conductivity of a solid electrolyte sheet manufactured with the solid electrolyte composition 1000 can be inhibited.

The solvent 102 may partially or completely dissolve the halide solid electrolyte 101. In the instance where the halide solid electrolyte 101 is dissolved, a solid electrolyte sheet manufactured with the solid electrolyte composition 1000 can have an improved density property.

The polar component $\delta p$ of the HSP of the solvent 102 present in the solid electrolyte composition 1000 may be determined by using a chemical analysis method. For example, nuclear magnetic resonance (NMR), Fourier transform infrared spectroscopy (FT-IR), mass spectrometry (MS), or elemental analysis may be used to identify a composition and a structure of the solvent 102, thereby determining the polar component $\delta p$ of the HSP. Furthermore, regarding solid electrolyte sheets manufactured from the solid electrolyte composition 1000, the polar component $\delta p$ of the HSP can also be determined for the solid electrolyte composition 1000 used for the manufacture, by analyzing the remaining solvent with any of the above-mentioned methods.

Resin Binder

The solid electrolyte composition 1000 may include the resin binder 103 so that the dispersibility of the solid electrolyte 101 in the solvent 102 can be improved, and adhesion between particles of the solid electrolyte 101 can be improved. Examples of the resin binder 103 include polyvinylidene fluoride (PVDF), polytetrafluoroethylene (PTFE), polyethylene, polypropylene, aramid resins, polyamides, polyimides, polyamide-imides, polyacrylonitrile, polyacrylic acids, poly(methyl acrylate), poly(ethyl acrylate), poly(hexyl acrylate), polymethacrylic acids, poly(methyl methacrylate), poly(ethyl methacrylate), poly(hexyl methacrylate), polyvinyl acetate, polyvinylpyrrolidone, polyethers, polycarbonates, polyether sulfones, polyetherketones, polyetheretherketones, polyphenylene sulfides, hexafluoropolypropylene, styrene butadiene rubber, carboxymethyl cellulose, and ethyl cellulose. The resin binder 103 may be a copolymer including two or more monomers selected from the group consisting of tetrafluoroethylene, hexafluoroethylene, hexafluoropropylene, perfluoroalkyl vinyl ether, vinylidene fluoride, chlorotrifluoroethylene, ethylene, propylene, butadiene, styrene, pentafluoropropylene, fluoromethyl vinyl ether, acrylic acid esters, acrylic acids, and hexadiene. These may be used alone or in a combination of two or more.

A binder 103 may include an elastomer because elastomers have excellent binding properties. The "elastomer" refers to a polymer having rubber elasticity. The elastomer used as the binder 103 may be a thermoplastic elastomer or a thermosetting elastomer. The binder 103 may include a thermoplastic elastomer. Examples of the elastomer include styrene-ethylene/butylene-styrene block copolymers (SEBS), styrene-ethylene/propylene-styrene block copolymers (SEPS), styrene-ethylene/ethylene/propylene-styrene block copolymers (SEEPS), butadiene rubbers (BR), isoprene rubbers (IR), chloroprene rubbers (CR), acrylonitrilebutadiene rubbers (NBR), styrene-butylene rubbers (SBR), styrene-butadiene-styrene block copolymers (SBS), styrene-isoprene-styrene block copolymers (SIS), hydrogenated isoprene rubbers (HIR), hydrogenated butyl rubbers (HIIR), hydrogenated nitrile rubbers (HNBR), and hydrogenated styrene-butylene rubbers (HSBR). The binder 103 may be a mixture including two or more selected from these.

The elastomer that is included in the binder 103 may include repeating units derived from styrene. The "repeating unit" refers to a molecular structure derived from a monomer and may also be referred to as a "structural unit". In the present disclosure, the elastomer including repeating units derived from styrene may be referred to as a "styrenic elastomer". Styrenic elastomers have enhanced flexibility and elasticity and are, therefore, suitable as a binder for solid electrolyte sheets.

Examples of the styrenic elastomer include styrene-ethylene/butylene-styrene block copolymers (SEBS), styrene-ethylene/propylene-styrene block copolymers (SEPS), styrene-ethylene/ethylene/propylene-styrene block copolymers (SEEPS), styrene-butylene rubbers (SBR), styrene-butadiene-styrene block copolymers (SBS), styrene-isoprene-styrene block copolymers (SIS), and hydrogenated styrene-butylene rubbers (HSBR). The binder 103 may include an SBR or an SEBS as the styrenic elastomer. The binder 103 may be a mixture including two or more selected from these. Because of the flexibility of styrenic elastomers, in instances where the binder 103 includes a styrenic elastomer, the binder 103 can impart flexibility to a solid electrolyte sheet manufactured from the solid electrolyte composition 1000. As a result, an electrolyte layer of a battery that uses the solid electrolyte sheet can be made to be thin, which can further improve the energy density of the battery.

The resin binder 103 may contain a modifying group. The modifying group is a functional group that chemically modifies all of the repeating units of the polymer chain, some of the repeating units of the polymer chain, or ends of the polymer chain by substitution, addition, or the like. Examples of the modifying group include functional groups containing an element such as O, N, or Si. O and N have a relatively high electronegativity, and Si has a relatively low electronegativity. When the resin binder 103 has such a functional group, a polarity can be imparted to the resin binder 103. Examples of the modifying group include carboxylic acid groups, maleic anhydride groups, acyl groups, hydroxy groups, sulfonic groups, sulfanyl groups, phosphoric acid groups, phosphonic acid groups, isocyanate groups, epoxy groups, silyl groups, amino groups, nitrile groups, and nitro groups. In the instance where the resin binder 103 contains a modifying group, the solid electrolyte 101 included in the solid electrolyte composition 1000 can exhibit further improved dispersibility. The binder 103 may include an SBR having a modifying group incorporated therein.

A weight average molecular weight (Mw) of the polymer present in the binder 103 of the first embodiment may be, for example, greater than or equal to 1,000 and less than or equal to 1,000,000 or greater than or equal to 10,000 and less than or equal to 500,000. When the weight average molecular weight of the polymer present in the binder 103 is greater than or equal to 1,000, particles of the solid electrolyte 101 can adhere to one another with a sufficient bonding strength. When the weight average molecular weight of the polymer present in the binder 103 is less than or equal to 1,000,000, the ion conduction between the particles of the solid electrolyte 101 is unlikely to be hindered by the binder 103, and, consequently, the charge-discharge characteristics of a battery can be improved. The weight average molecular weight of the polymer present in the binder 103 can be determined, for example, by performing a measurement by gel permeation chromatography (GPC) using polystyrene as a standard. In other words, the weight average molecular weight is the value of a polystyrene equivalent molecular weight. The GPC measurement may use chloroform as an eluent.

A ratio of a mass of the binder 103 to a mass of the solid electrolyte 101 may be, for example, 0.5 mass %. The ratio may be greater than or equal to 1 mass %, greater than or equal to 2 mass %, greater than or equal to 3 mass %, greater than or equal to 5 mass %, or greater than or equal to 8 mass %. The upper limit of the ratio of the mass of the binder 103 to the mass of the solid electrolyte 101 is, for example, 10 mass %.

The solid electrolyte composition 1000 may be in the form of a paste or a dispersion liquid. The solid electrolyte 101 are particles, for example. The particles of the solid electrolyte 101 are mixed with the solvent 102 in the solid electrolyte composition 1000. Regarding the manufacture of the solid electrolyte composition 1000, the method for mixing the solid electrolyte 101, the solvent 102, and the resin binder 103 with one another is not particularly limited. The method for mixing may be a method using a mixing device, such as a stirrer-type device, a shaker-type device, or a rotary-type device. Examples of the method for mixing include methods that use a kneading and dispersing device, examples of which include a high-speed homogenizer, a thin-film spin system high-speed mixer, an ultrasonic homogenizer, a ball mill, a bead mill, a planetary mixer, a sand mill, a roll mill, and a kneader. These methods for mixing may be used alone or in a combination of two or more.

The solid electrolyte composition 1000 is manufactured, for example, by using the following method. First, the solid electrolyte 101 and the solvent 102 are mixed together, and wet milling and dispersion are performed in a ball mill or bead mill device. With this process, the solid electrolyte 101 can be reduced to fine particles with a particle diameter of less than or equal to 1 μm, and the solid electrolyte 101 can be uniformly dispersed in the solvent 102. Next, a resin binder solution is added to the obtained dispersion liquid while shear dispersion is performed thereon with a homogenizer or a high-speed shear mixer. In this manner, the solid electrolyte composition 1000 is prepared. With this process, the fine particles of the solid electrolyte 101 can be dispersed and stabilized in the solvent 102, and, consequently, the manufactured solid electrolyte composition 1000 has enhanced flowability.

The resin binder solution is a solution containing the resin binder 103 and the solvent 102. A composition of the solvent present in the resin binder solution may be the same as or different from a composition of the solvent present in the dispersion liquid including the solid electrolyte 101.

A solids concentration of the solid electrolyte composition 1000 is appropriately specified in accordance with the particle diameter of the solid electrolyte 101, the type of the solvent 102, and the type of the resin binder 103. The solids concentration may be greater than or equal to 10 mass % and less than or equal to 60 mass % or greater than or equal to 20 mass % and less than or equal to 40 mass %. When the solids concentration is greater than or equal to 20 mass %, the solid electrolyte composition 1000 can have an increased viscosity, and, consequently, sagging that may otherwise occur during the application of the solid electrolyte composition 1000 to a substrate can be inhibited. When the solids concentration is less than or equal to 40 mass %, a wet film thickness, which is a film thickness in the process of forming a coated film by applying the solid electrolyte composition 1000 onto a substrate, can be increased, and, consequently, the manufactured solid electrolyte sheet can have a more uniform film thickness.

The rheological properties of the solid electrolyte composition 1000 can be quantified as values of a viscosity, a yield stress, a storage modulus G', and a loss tangent tan δ, which can be determined with a viscosity/viscoelasticity measuring device. The values of the viscosity, the yield stress, the storage modulus, and the loss tangent of the solid electrolyte composition 1000 can be adjusted by controlling the solids concentration, the manufacturing method, and a compositional ratio between the components, which are the solid electrolyte 101, the solvent 102, and the resin binder 103.

The solid electrolyte composition 1000 may have a viscosity of greater than or equal to 1 Pa·s and less than or equal to 15 Pa·s as measured under the conditions of 25° C. and a shear rate of 1/s by a viscosity/viscoelasticity measuring device. When the viscosity is greater than or equal to 1 Pa·s, sagging that may otherwise occur during the application of the solid electrolyte composition 1000 to a substrate can be inhibited. When the viscosity is less than or equal to 15 Pa·s, a coated film that is produced can have a more uniform thickness. The viscosity may be greater than or equal to 2.4 Pa·s and less than or equal to 16.3 Pa·s as measured under the conditions of 25° C. and a shear rate of 1/s.

The solid electrolyte composition 1000 may have a viscosity of greater than or equal to 10 mPa·s as measured under the conditions of 25° C. and a shear rate of 1000/s by a viscosity/viscoelasticity measuring device. When the viscosity is greater than or equal to 10 mPa·s, an affinity between the solid electrolyte 101 and the solvent 102 can be enhanced. As a result, separation between the solid electrolyte 101 and the solvent 102 can be inhibited, which enables efficient delivery and application of the solid electrolyte composition 1000. The viscosity may be greater than or equal to 21.6 mPa·s as measured under the conditions of 25° C. and a shear rate of 1000/s.

Ideally, the viscosity measured under the condition of the low shear rate of 1/s is not to be excessively high, and the viscosity measured under the condition of the high shear rate of 1000/s is not to be excessively low. Accordingly, a range of the viscosity may be specified according to the combination of the upper limit of the viscosity measured under the condition of the low shear rate of 1/s and the lower limit of the viscosity measured under the condition of the high shear rate of 1000/s.

The solid electrolyte composition 1000 may have a yield stress of less than or equal to 25 Pa as measured under the condition of 25° C. by a viscosity/viscoelasticity measuring device. When the yield stress is less than or equal to 25 Pa, a coated film that is produced is more uniform. The yield stress may be greater than or equal to 3.8 Pa and less than or equal to 22.0 Pa.

Figure 2:
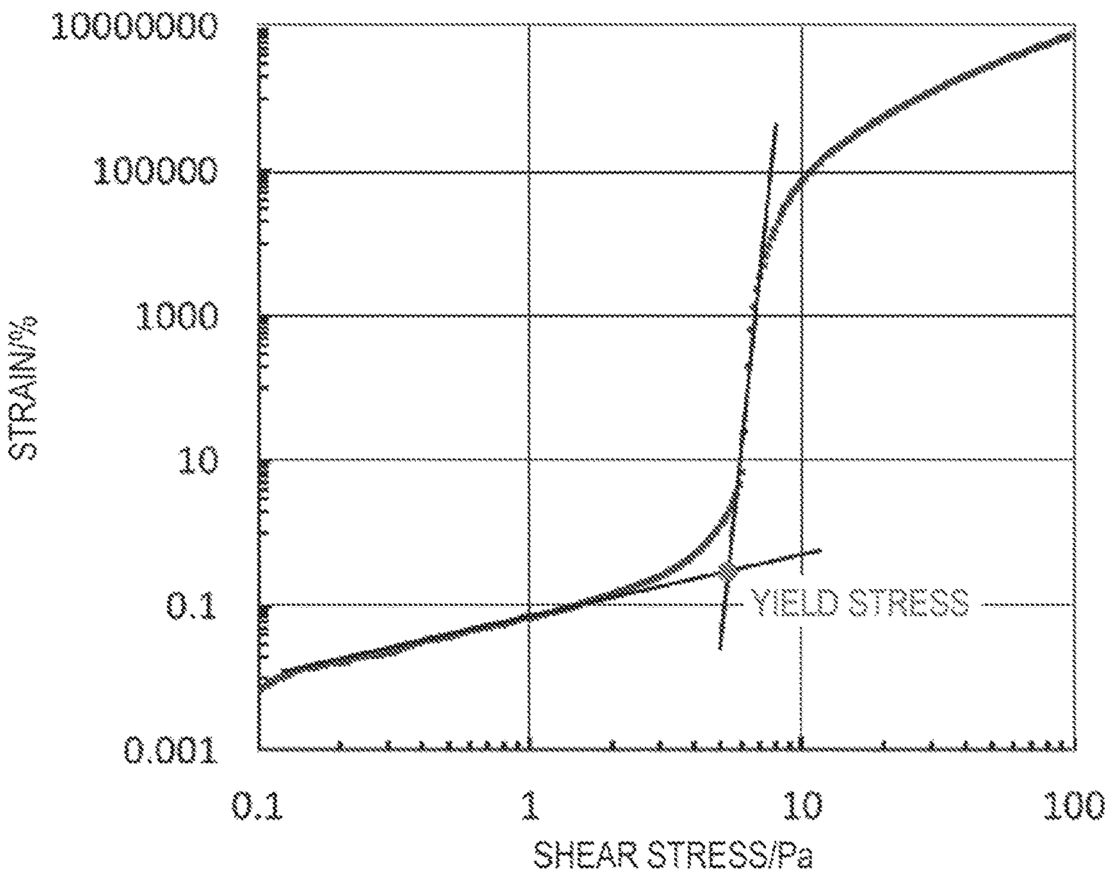
FIG. 2 is a diagram illustrating a manner of determining a yield stress.

FIG. 2 is a diagram illustrating a manner of determining the yield stress. An amount of strain, which is represented on the vertical axis, is measured while a shear stress, which is represented on the horizontal axis, is controlled. The point of intersection of a tangent line drawn for a low-strain elastic deformation region with a tangent line drawn for a high-strain plastic deformation region represents the yield stress.

The solid electrolyte composition 1000 may have a storage modulus G' of greater than or equal to 1 Pa and less than or equal to 40 Pa as measured under the conditions of 25° C., a frequency of 1 Hz, and an amount of strain of 10% to 25%, by a viscosity/viscoelasticity measuring device. Furthermore, the solid electrolyte composition 1000 may have a loss tangent tan δ of greater than or equal to 0.8 and less than or equal to 3.0 as measured under the same conditions. In instances where at least one of the storage modulus G' and the loss tangent tan δ is adjusted to be within the above-mentioned range, the solid electrolyte composition 1000 can have good flowability. This enables producing a coated film that is more uniform. The storage modulus G' may be greater than or equal to 2.5 Pa and less than or equal to 32.4 Pa, and the loss tangent tan δ may be greater than or equal to 0.80 and less than or equal to 2.99.

Second Embodiment

A second embodiment will be described below. Descriptions that are the same as those in the first embodiment will be omitted where appropriate.

Figure 3:
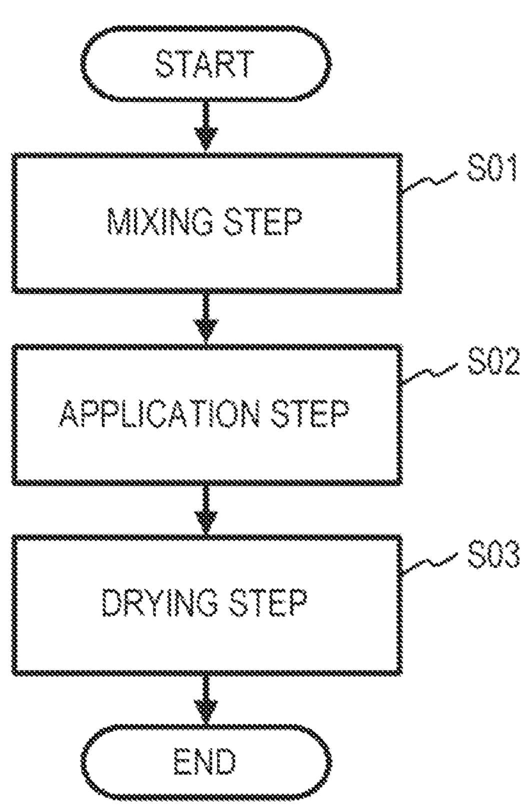
FIG. 3 is a flowchart illustrating a method for manufacturing a solid electrolyte sheet 201, according to a second embodiment.

A method for manufacturing a solid electrolyte sheet will be described below with reference to FIG. 3. FIG. 3 is a flowchart illustrating the method for manufacturing a solid electrolyte sheet.

The method for manufacturing a solid electrolyte sheet may include a step S01, a step S02, and a step S03. The step S01 in FIG. 3 is described above in the first embodiment. The method for manufacturing a solid electrolyte sheet includes the step S02, in which the solid electrolyte composition 1000 of the first embodiment is applied, and the step S03, in which the solid electrolyte composition 1000 is dried. The step S01, the step S02, and the step S03 may be carried out in this order. By using these steps, a solid electrolyte sheet 201, which has excellent surface smoothness, can be manufactured with the solid electrolyte composition 1000 of the first embodiment.

Figure 4:
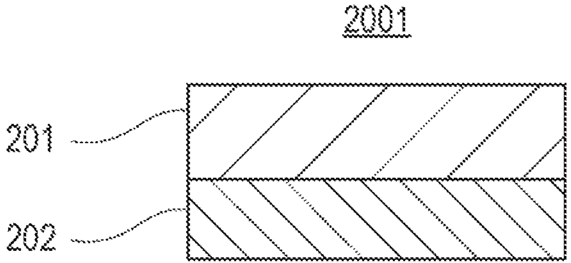
FIG. 4 is a cross-sectional view of an electrode 2001, according to the second embodiment.

FIG. 4 is a cross-sectional view of an electrode 2001, according to the second embodiment. The step S02 including a step of applying the solid electrolyte composition 1000 onto an electrode 202 enables manufacturing the electrode 2001.

Figure 5:
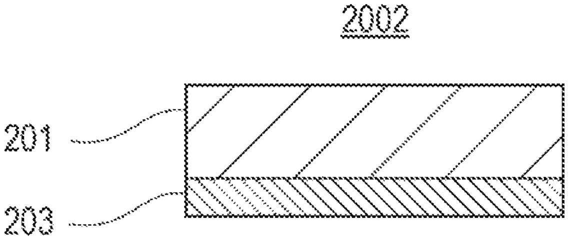
FIG. 5 is a cross-sectional view of a transfer sheet 2002, according to the second embodiment.

FIG. 5 is a cross-sectional view of a transfer sheet 2002, according to the second embodiment. The step S02 including a step of applying the solid electrolyte composition 1000 onto a substrate 203 enables manufacturing the transfer sheet 2002.

In the step S02, the solid electrolyte composition 1000 is applied to the electrode 202 or the substrate 203. Accordingly, a coated film made from the solid electrolyte composition 1000 is formed on the electrode 202 or the substrate 203.

The electrode 202 may be a positive electrode or a negative electrode or may be a member produced by applying a solid electrolyte onto a positive electrode or a negative electrode. The positive electrode or the negative electrode includes a current collector and an active material layer disposed on the current collector. The electrode 2001, which is formed of a multilayer body made of the electrode 202 and the solid electrolyte sheet 201, is manufactured by applying the solid electrolyte composition 1000 onto the electrode 202 and subjecting the resultant to the step S03, which will be described later.

A material that is used as the substrate 203 may be a metal foil or a plastic film. Examples of materials of the metal foil include copper (Cu), aluminum (Al), iron (Fe), nickel (Ni), and alloys of any of the foregoing metals. Examples of materials of the plastic film include polyethylene terephthalate (PET), polyimide (PI), and polytetrafluoroethylene (PTFE). The transfer sheet 2002, which is formed of a multilayer body made of the substrate 203 and the solid electrolyte sheet 201, is manufactured by applying the solid electrolyte composition 1000 onto the substrate 203 and subjecting the resultant to the step S03, which will be described later.

Examples of methods for the application include die coating methods, gravure coating methods, doctor blade methods, bar coating methods, spray coating methods, and electrostatic coating methods. From the standpoint of mass productivity, a die coating method may be selected for the application.

In the step S03, the solid electrolyte composition 1000 applied to the substrate 203 is dried. The drying of the solid electrolyte composition 1000 allows, for example, the solvent 102 to be removed from the coated film made from the solid electrolyte composition 1000, which results in the manufacture of the solid electrolyte sheet.

Examples of methods for the drying for the removal of the solvent 102 from the solid electrolyte composition 1000 include warm or hot air drying, infrared heat drying, reduced pressure drying, vacuum drying, drying by high-frequency dielectric heating, and drying by high-frequency induction heating. These may be used alone or in a combination of two or more.

Reduced pressure drying may be used for the removal of the solvent 102 from the solid electrolyte composition 1000. That is, the solvent 102 may be removed from the solid electrolyte composition 1000 in an atmosphere having a pressure less than the atmospheric pressure. The atmosphere having a pressure less than the atmospheric pressure may have a gauge pressure of less than or equal to −0.01 MPa, for example. The reduced pressure drying may be carried out at a temperature of greater than or equal to 50° C. and less than or equal to 250° C.

Vacuum drying may be used for the removal of the solvent 102 from the solid electrolyte composition 1000. That is, the solvent 102 may be removed from the solid electrolyte composition 1000 in an atmosphere having a temperature less than the boiling point of the solvent 102 and having a pressure less than or equal to an equilibrium vapor pressure of the solvent 102.

From the standpoint of manufacturing cost, warm or hot air drying may be selected for the removal of the solvent 102 from the solid electrolyte composition 1000. A set temperature of the warm or hot air may be greater than or equal to 50° C. and less than or equal to 250° C. or greater than or equal to 80° C. or less than or equal to 150° C.

The removal of the solvent 102 can be examined, for example, by Fourier transform infrared spectroscopy (FT-IR), X-ray photoelectron spectroscopy (XPS), gas chromatography (GC), or gas chromatography-mass spectrometry (GC/MS). Note that complete removal of the solvent 102 is not necessary provided that the solid electrolyte sheet 201 after drying has ionic conductivity. A portion of the solvent 102 may remain in the solid electrolyte sheet 201.

The ionic conductivity of the solid electrolyte sheet 201 may be greater than or equal to 0.1 mS/cm. The ionic conductivity of greater than or equal to 0.1 mS/cm can improve the power characteristics of a battery. Furthermore, the solid electrolyte sheet 201 may be pressure-molded with a press machine or the like to improve the ionic conductivity of the solid electrolyte sheet 201.

Third Embodiment

A third embodiment will be described below. Descriptions that are the same as those in the first embodiment or the second embodiment will be omitted where appropriate.

Figure 6:
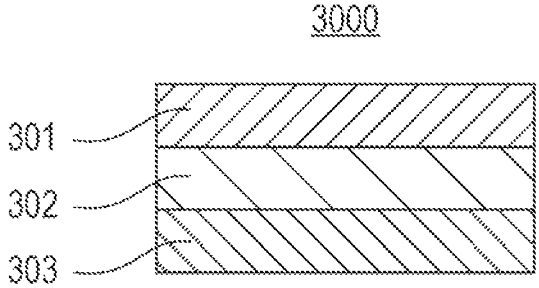
FIG. 6 is a cross-sectional view of a battery 3000, according to a third embodiment.

FIG. 6 is a cross-sectional view of a battery 3000, according to the third embodiment.

The battery 3000 of the third embodiment includes a positive electrode 301, a negative electrode 303, and an electrolyte layer 302.

The electrolyte layer 302 is disposed between the positive electrode 301 and the negative electrode 303.

The electrolyte layer 302 includes the solid electrolyte sheet 201 of the second embodiment.

The battery 3000 includes the solid electrolyte sheet 201, which has excellent surface smoothness. When a surface of the solid electrolyte sheet 201 is smooth, thickness variations of the solid electrolyte sheet 201 are small. When the thickness variations are small, the solid electrolyte sheet 201 can have a thickness close to a design value at all in-plane positions. Accordingly, even in instances where the thickness of the electrolyte layer 302 is further reduced, the possibility of contact (short circuit) between the positive electrode 301 and the negative electrode 303 can be reduced, which can improve the energy density. Furthermore, the inclusion of the solid electrolyte sheet 201 that includes the solid electrolyte 101, which is highly thermally stable, enhances the safety of the battery 3000.

The battery 3000 can be manufactured, for example, by combining the electrode 2001 of the second embodiment with an electrode having a polarity opposite to the polarity of the electrode 2001. This method is excellent in terms of reducing the number of parts. When the electrode 2001 is a positive electrode, the electrode having a polarity opposite to the polarity of the electrode 2001 is a negative electrode. When the electrode 2001 is a negative electrode, the electrode having a polarity opposite to the polarity of the electrode 2001 is a positive electrode. The positive electrode or the negative electrode includes a current collector and an active material layer disposed on the current collector. A layer including a solid electrolyte may be provided on the active material layer of the positive electrode or the active material layer of the negative electrode.

The battery 3000 may be manufactured with the transfer sheet 2002 of the second embodiment. That is, the battery 3000 can be manufactured by transferring the solid electrolyte sheet 201 to a first electrode from the transfer sheet 2002 and combining the first electrode with a second electrode in a manner such that the transferred solid electrolyte sheet 201 is disposed between the first electrode and the second electrode. The transferring of the solid electrolyte sheet 201 from the transfer sheet 2002 to the first electrode is carried out by laying the transfer sheet on the first electrode in a manner such that the solid electrolyte sheet 201 is in contact with the first electrode and thereafter removing the substrate 203. In this manner, the solid electrolyte sheet 201 is transferred to the first electrode. When the first electrode is a positive electrode, the second electrode is a negative electrode. When the first electrode is a negative electrode, the second electrode is a positive electrode. The positive electrode and the negative electrode include a current collector and an active material layer disposed on the current collector. A layer including a solid electrolyte may be provided on the active material layer of the positive electrode or the active material layer of the negative electrode.

In instances where the method that uses the transfer sheet 2002 is employed, the influence of the solvent, which is used in the preparation of the solid electrolyte sheet 201, over the positive electrode or the negative electrode need not be considered because the solid electrolyte sheet 201 is prepared in a step different from those for the positive electrode and the negative electrode. Accordingly, a wider choice of solvents can be used.

The electrolyte layer 302 is a layer including an electrolyte material. The electrolyte material is, for example, a solid electrolyte. That is, the electrolyte layer 302 may be a solid electrolyte layer. Examples of the solid electrolyte that is included in the electrolyte layer 302 include sulfide solid electrolytes, oxide solid electrolytes, halide solid electrolytes, polymer solid electrolytes, and complex hydride solid electrolytes. For example, the solid electrolyte may be a halide solid electrolyte.

In the present disclosure, the "oxide solid electrolyte" is a solid electrolyte containing oxygen. The oxide solid electrolyte may contain additional anions, in addition to oxygen anions. The additional anions may be anions other than those of sulfur or those of halogen elements.

The "halide solid electrolyte" is as described above in the first embodiment and equivalent to the solid electrolyte 101 that is included in the solid electrolyte composition 1000 of the first embodiment.

Examples of sulfide solid electrolytes include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. LiX, $Li_2O$, $MO_q$, $Li_pMO_q$, and/or the like may be added to the aforementioned substances. The element X of LiX is at least one selected from the group consisting of F, Cl, Br, and I. The element M of $MO_q$ and $Li_pMO_q$ is at least one selected from the group consisting of P, Si, Ge, B, Al, Ga, In, Fe, and Zn. p and q of $MO_q$ and $Li_pMO_q$ are each independently a natural number.

Examples of the oxide solid electrolyte include NASICON-type solid electrolytes typified by $LiTi_2(PO_4)_3$ and element-substituted derivatives thereof; $(LaLi)TiO_3$-system perovskite-type solid electrolytes; LISICON-type solid electrolytes typified by $Li_{14}ZnGe_4O_{16}$, $Li_4SiO_4$, and $LiGeO_4$ and element-substituted derivatives thereof; garnet-type solid electrolytes typified by $Li_7La_3Zr_2O_{12}$ and element-substituted derivatives thereof; $Li_3PO_4$ and N-substituted derivatives thereof; and glass or glass-ceramics in which $Li_2SO_4$, $Li_2CO_3$, or the like has been added to a base material containing a Li—B—O compound such as $LiBO_2$ or $Li_3BO_3$.

Examples of polymer solid electrolytes include compounds of a polymeric compound and a lithium salt. The polymeric compound may have an ethylene oxide structure. Polymeric compounds having an ethylene oxide structure can contain large amounts of a lithium salt. Accordingly, the ionic conductivity can be further enhanced. Examples of lithium salts include $LiPF_6$, $LiBF_4$, $LiSbF_6$, $LiAsF_6$, $LiSO_3CF_3$, $LiN(SO_2F)_2$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt may be used alone, or two or more lithium salts may be used in combination.

Examples of complex hydride solid electrolytes include $LiBH_4$—LiI and $LiBH_4$-$P_2S_5$.

The electrolyte layer 302 may contain the solid electrolyte as a major component. That is, the electrolyte layer 302 may contain the solid electrolyte in an amount of, for example, greater than or equal to 70% in mass percentage (greater than or equal to 70 mass %) relative to a total mass of the electrolyte layer 302.

With this configuration, the battery 3000 can have further improved power characteristics.

The electrolyte layer 302 may further contain incidental impurities while containing the solid electrolyte as a major component. Examples of the incidental impurities include a portion of the starting materials used in the synthesis of the solid electrolyte and by-products and decomposition products resulting from the synthesis.

The electrolyte layer 302 may contain the solid electrolyte in an amount of, for example, 100% in mass percentage relative to the total mass of the electrolyte layer 302, where the percentage of the impurities that are inevitably incorporated is not taken into account.

With this configuration, the battery 3000 can have further improved power characteristics.

The electrolyte layer 302 may include two or more of the materials mentioned above as solid electrolytes. For example, the electrolyte layer 302 may include a halide solid electrolyte and a sulfide solid electrolyte.

The electrolyte layer 302 may be a layer produced by stacking multiple layers. One of the layers may be a layer in which the solid electrolyte sheet 201 is used, and the other of the layers may be a layer containing a solid electrolyte having a composition different from a composition of the solid electrolyte 101, which is included in the solid electrolyte sheet 201. The electrolyte layer 302 may be a single layer formed of the solid electrolyte sheet 201, or the electrolyte layer 302 may be a plurality of layers including a layer formed of the solid electrolyte sheet 201 and including one or more other layers. The one or more other layers may include a solid electrolyte different from the solid electrolyte of the solid electrolyte sheet 201.

The electrolyte layer 302 may include a second layer disposed between the negative electrode 303 and the layer in which the solid electrolyte sheet 201 is used, and the second layer may contain a solid electrolyte having a reduction potential less noble than that of the solid electrolyte 101 that is included in the solid electrolyte sheet 201. With this configuration, it is possible to inhibit reductive decomposition of the solid electrolyte 101, which may otherwise be caused by contact of the solid electrolyte 101 with a negative electrode active material, and, consequently, the battery can have improved power characteristics. Examples of the solid electrolyte having a reduction potential less noble than that of the solid electrolyte 101 include sulfide solid electrolytes.

The electrolyte layer 302 may have a thickness of greater than or equal to 1 μm and less than or equal to 300 μm. When the thickness of the electrolyte layer 302 is greater than or equal to 1 μm, the likelihood of short-circuiting between the positive electrode 301 and the negative electrode 303 is reduced. Furthermore, when the thickness of the electrolyte layer 302 is less than or equal to 300 μm, high-power operation is facilitated. That is, when the electrolyte layer 302 has an appropriately adjusted thickness, sufficient safety of the battery 3000 can be ensured, and the battery 3000 can be caused to operate at high power.

The solid electrolyte sheet 201 that is included in the electrolyte layer 302 may have a thickness of greater than or equal to 1 μm and less than or equal to 20 μm. When the thickness of the solid electrolyte sheet 201 is greater than or equal to 1 μm, the likelihood of short-circuiting between the positive electrode 301 and the negative electrode 303 is reduced. Furthermore, when the thickness of the solid electrolyte sheet 201 is less than or equal to 20 μm, an internal resistance of the battery is reduced, which enables high-power operation, and, therefore, the battery 3000 can have an improved energy density. The thickness of the solid electrolyte sheet is defined, for example, as an average of thicknesses at multiple arbitrary points (e.g., three points) on a cross section parallel to a direction of the thickness.

The surface smoothness of the solid electrolyte sheet 201 can be evaluated with at least one of an arithmetic mean height Sa and a maximum height Sz. For example, the arithmetic mean height Sa of a major surface of the solid electrolyte sheet 201 may be less than or equal to 0.40 μm as measured by a profile-analyzing laser microscope (VK-X1000, manufactured by Keyence Corporation) at an objective lens magnification of 50×. In instances where the major surface of the solid electrolyte sheet 201 exhibits an arithmetic mean height Sa in such a range, the effects described earlier can be sufficiently produced. The lower limit of the arithmetic mean height Sa is not particularly limited and is, for example, 0.20 μm. The "major surface" is a surface having a largest area.

The maximum height Sz of the major surface of the solid electrolyte sheet 201 may be less than or equal to 7.0 μm. The lower limit of the maximum height Sz is not particularly limited and is, for example, 3.0 μm.

The arithmetic mean height Sa is a parameter that is an expanded version of an arithmetic mean roughness Ra (an arithmetic mean height for a line) and determined for a surface. The maximum height Sz is a parameter that is an expanded version of a maximum height Rz (a maximum height for a line) and determined for a surface. The arithmetic mean height Sa and the maximum height Sz are each specified in ISO 25178.

A shape of the solid electrolyte that is included in the battery 3000 is not limited. For example, the shape of the solid electrolyte may be a needle shape, a spherical shape, an ellipsoidal shape, or the like. For example, the shape of the solid electrolyte may be a particle shape.

At least one of the positive electrode 301 and the negative electrode 303 may include an electrolyte material, which may be, for example, a solid electrolyte. The solid electrolyte may be any of the solid electrolytes mentioned above as examples of materials that form the electrolyte layer 302. With this configuration, the positive electrode 301 or the negative electrode 303 has increased ionic conductivity (e.g., lithium ion conductivity) in its interior, which enables high-power operation.

The positive electrode 301 includes, for example, a positive electrode active material that is a material having a property of occluding and releasing metal ions (e.g., lithium ions). Examples of the positive electrode active material include transition metal oxides, transition metal fluorides, polyanionic materials, fluorinated polyanionic materials, transition metal sulfides, transition metal oxysulfides, transition metal oxynitrides, and lithium compounds thereof. Examples of the lithium transition metal oxides include $Li(NiCoAl)O_2$, $Li(NiCoMn)O_2$, and $LiCoO_2$. In instances where a lithium transition metal oxide, for example, is used as the positive electrode active material, the cost of manufacturing the electrode can be reduced, and an average discharge voltage can be increased. The expression "$Li(NiCoAl)O_2$" means that Ni, Co, and Al may be present in any ratio. The expression "$Li(NiCoMn)O_2$" means that Ni, Co, and Mn may be present in any ratio.

When the shape of the solid electrolyte that is included in the positive electrode 301 is a particle shape (e.g., a spherical shape), the solid electrolyte may have a median diameter of less than or equal to 100 μm. When the median diameter of the solid electrolyte is less than or equal to 100 μm, the positive electrode active material and the solid electrolyte can be favorably dispersed in the positive electrode 301. Consequently, the battery 3000 has improved charge-discharge characteristics.

The median diameter of the solid electrolyte that is included in the positive electrode 301 may be less than a median diameter of the positive electrode active material. In this case, the solid electrolyte and the positive electrode active material can be favorably dispersed.

The median diameter of the positive electrode active material may be greater than or equal to 0.1 μm and less than or equal to 100 μm. When the median diameter of the positive electrode active material is greater than or equal to 0.1 μm, the positive electrode active material and the solid electrolyte can be favorably dispersed in the positive electrode 301. As a result, the battery 3000 has improved charge-discharge characteristics. When the median diameter of the positive electrode active material is less than or equal to 100 μm, a lithium diffusion rate in the positive electrode active material is improved. Consequently, the battery 3000 can operate at high power.

When volume fractions of the positive electrode active material and the solid electrolyte that are present in the positive electrode 301 are expressed as "v1:100-v1", $30 \le v1 \le 95$ may be satisfied. Here, v1 represents the volume fraction of the positive electrode active material, which is a volume fraction relative to a total volume of the positive electrode active material and the solid electrolyte that are present in the positive electrode 301 taken as 100. When $30 \le v1$ is satisfied, a sufficient energy density of the battery 3000 can be easily ensured. When $v1 \le 95$ is satisfied, high-power operation of the battery 3000 is further facilitated.

The positive electrode 301 may have a thickness of greater than or equal to 10 μm and less than or equal to 500 μm. When the thickness of the positive electrode 301 is greater than or equal to 10 μm, a sufficient energy density of the battery 3000 is easily ensured. When the thickness of the positive electrode 301 is less than or equal to 500 μm, high-power operation of the battery 3000 is further facilitated.

The negative electrode 303 includes, for example, a negative electrode active material that is a material having a property of occluding and releasing metal ions (e.g., lithium ions). Examples of the negative electrode active material include metal materials, carbon materials, oxides, nitrides, tin compounds, and silicon compounds. The metal materials may be elemental metals or alloys. Examples of the metal materials include lithium metals and lithium alloys. Examples of the carbon materials include natural graphite, coke, partially-graphitized carbon, carbon fibers, spherical carbon, artificial graphite, and amorphous carbon. In instances where silicon (Si), tin (Sn), a silicon compound, a tin compound, or the like is used, a capacity density of the battery can be improved. In instances where an oxide compound containing titanium (Ti) or niobium (Nb) is used as the negative electrode active material, the safety of the battery can be improved.

The negative electrode active material may have a median diameter of greater than or equal to 0.1 μm and less than or equal to 100 μm. When the median diameter of the negative electrode active material is greater than or equal to 0.1 μm, the negative electrode active material and the solid electrolyte can be favorably dispersed in the negative electrode 303. Consequently, the battery 3000 has improved charge-discharge characteristics. When the median diameter of the negative electrode active material is less than or equal to 100 μm, a lithium diffusion rate in the negative electrode active material is improved. Consequently, the battery 3000 can operate at high power.

The median diameter of the negative electrode active material may be greater than a median diameter of the solid electrolyte that is included in the negative electrode 303. In this case, the solid electrolyte and the negative electrode active material can be favorably dispersed.

When volume fractions of the negative electrode active material and the solid electrolyte that are present in the negative electrode 303 are expressed as "v2:100-v2", 30≤v2≤95 may be satisfied. Here, v2 represents the volume fraction of the negative electrode active material, which is a volume fraction relative to a total volume of the negative electrode active material and the solid electrolyte that are present in the negative electrode 303 taken as 100. When 30≤v2 is satisfied, a sufficient energy density of the battery 3000 can be easily ensured. When v2≤95 is satisfied, high-power operation of the battery 3000 is further facilitated.

The negative electrode 303 may have a thickness of greater than or equal to 10 μm and less than or equal to 500 μm. When the thickness of the negative electrode 303 is greater than or equal to 10 μm, a sufficient energy density of the battery 3000 is easily ensured. When the thickness of the negative electrode 303 is less than or equal to 500 μm, high-power operation of the battery 3000 is further facilitated.

The positive electrode active material and the negative electrode active material may be coated with a coating material so that interfacial resistance between each of the active materials and the solid electrolyte can be reduced. The coating material may be a material having low electron conductivity. The coating material may be an oxide material, an oxide solid electrolyte, or the like.

Examples of oxide materials that can be used as the coating material include $SiO_2$, $Al_2O_3$, $TiO_2$, $B_2O_3$, $Nb_2O_5$, $WO_3$, and $ZrO_2$.

Examples of oxide solid electrolytes that can be used as the coating material include Li—Nb—O compounds, such as $LiNbO_3$; LI—B—O compounds, such as $LiBO_2$ and $Li_3BO_3$; Li—Al—O compounds, such as $LiAlO_2$; Li—Si—O compounds, such as $Li_4SiO_4$; $Li_2SO_4$; Li—Ti—O compounds, such as $Li_4Ti_5O_{12}$; Li—Zr—O compounds, such as $Li_2ZrO_3$; Li—Mo—O compounds, such as $Li_2MoO_3$; Li—V—O compounds, such as $LiV_2O_5$; and Li—W—O compounds, such as $Li_2WO_4$. Oxide solid electrolytes have high ionic conductivity and high high-potential stability. Accordingly, using an oxide solid electrolyte as the coating material enables the charge-discharge efficiency of the battery to be further improved.

A binding agent may be included in at least one selected from the group consisting of the positive electrode 301, the electrolyte layer 302, and the negative electrode 303, to improve adhesion between particles. Examples of the binding agent include the materials mentioned above for the binder 103. In instances where the binding agent includes an elastomer, the layers of the positive electrode 301, the electrolyte layer 302, and the negative electrode 303 that are included in the battery 3000 exhibit excellent flexibility and resiliency, and, therefore, the battery can have improved durability.

A non-aqueous electrolyte solution, a gel electrolyte, or an ionic liquid may be included in at least one selected from the group consisting of the positive electrode 301, the electrolyte layer 302, and the negative electrode 303, to facilitate the transfer of lithium ions, thereby improving the power characteristics of the battery 3000.

The non-aqueous electrolyte solution includes a non-aqueous solvent and a lithium salt dissolved in the non-aqueous solvent. Examples of the non-aqueous solvent include cyclic carbonate solvents, chain carbonate solvents, cyclic ether solvents, chain ether solvents, cyclic ester solvents, chain ester solvents, and fluorinated solvents. Examples of the cyclic carbonate solvents include ethylene carbonate, propylene carbonate, and butylene carbonate. Examples of the chain carbonate solvents include dimethyl carbonate, ethyl methyl carbonate, and diethyl carbonate. Examples of the cyclic ether solvents include tetrahydrofuran, 1,4-dioxane, and 1,3-dioxolane. Examples of the chain ether solvents include 1,2-dimethoxyethane and 1,2-diethoxyethane. Examples of the cyclic ester solvents include γ-butyrolactone. Examples of the chain ester solvents include methyl acetate. Examples of the fluorinated solvents include fluoroethylene carbonate, fluoromethyl propionate, fluorobenzene, fluoroethyl methyl carbonate, and fluorodimethylene carbonate. The non-aqueous solvent that may be used may be a single non-aqueous solvent selected from these solvents or may be a mixture of two or more non-aqueous solvents selected from these solvents.

The non-aqueous electrolyte solution may include at least one fluorinated solvent selected from the group consisting of fluoroethylene carbonate, fluoromethyl propionate, fluorobenzene, fluoroethyl methyl carbonate, and fluorodimethylene carbonate.

Examples of the lithium salt include $LiPF_6$, $LiBF_4$, $LiSbF_6$, $LiAsF_6$, $LiSO_3CF_3$, $LiN(SO_2F)_2$, $LiN(SO_2CF_3)_2$, $LiN(SO_2C_2F_5)_2$, $LiN(SO_2CF_3)(SO_2C_4F_9)$, and $LiC(SO_2CF_3)_3$. The lithium salt that may be used may be a single lithium salt selected from these lithium salts or may be a mixture of two or more lithium salts selected from these lithium salts. The lithium salt may have a concentration of greater than or equal to 0.5 mol/liter and less than or equal to 2 mol/liter, for example.

The gel electrolyte may be a material in which a non-aqueous electrolyte solution is contained in a polymeric material. Examples of the polymeric material include polyethylene oxide, polyacrylonitrile, polyvinylidene fluoride, polymethylmethacrylate, and polymers having an ethylene oxide linkage.

Examples of a cation that forms the ionic liquid include aliphatic chain quaternary cations, such as tetraalkylammonium and tetraalkylphosphonium; aliphatic cyclic ammoniums, such as pyrrolidiniums, morpholiniums, imidazoliniums, tetrahydropyridinium, piperaziniums, and piperidiniums; and nitrogen-containing heterocyclic aromatic cations, such as pyridiniums and imidazoliums. Examples of an anion that forms the ionic liquid include $PF_6^-$, $BF_4^-$, $SbF_6^-$, $AsF_6^-$, $SO_3CF_3^-$, $N(SO_2F)_2$, $N(SO_2CF_3)_2^-$, $N(SO_2C_2F_5)_2$, $N(SO_2CF_3)(SO_2C_4F_9)^-$, and $C(SO_2CF_3)_3^-$. The ionic liquid may contain a lithium salt.

A conductive additive may be included in at least one of the positive electrode 301 and the negative electrode 303 to enhance electron conductivity. Examples of the conductive additive include graphites, such as natural graphite and artificial graphite; carbon blacks, such as acetylene black and Ketjen black; conductive fibers, such as carbon fibers and metal fibers; conductive powders, such as those of carbon fluoride and those of aluminum; conductive whiskers, such as those of zinc oxide and those of potassium titanate; conductive metal oxides, such as titanium oxide; and conductive polymers, such as polyaniline, polypyrrole, and polythiophene. In instances where a carbon material is used as the conductive additive, cost reduction can be achieved.

Examples of a shape of the battery include coin shapes, cylindrical shapes, prismatic shapes, sheet shapes, button shapes, flat shapes, and stack shapes.

EXAMPLES

Details of the present disclosure will now be described with reference to Examples and Comparative Examples.

Note that the solid electrolyte composition, the solid electrolyte sheet, and the battery of the present disclosure are not limited to the examples described below.

Example 1-1

Preparation of Halide Solid Electrolyte

In an argon glove box with a dew point of −60° C. or less, raw material powders of $YCl_3$, $LiC_1$, and LiBr were weighed in a manner such that a molar ratio of $YCl_3$:LiCl:LiBr=1:1:2 was achieved. Subsequently, these raw material powders were mixed together. The resulting mixture was heat-treated at 520° C. for 2 hours in an electric furnace. In this manner, $Li_3YBr_2C_{14}$ (hereinafter referred to as "LYBC"), which is a halide solid electrolyte, was obtained.

Solvent

In all of the processes described below, the solvent used was a commercially available dehydrated solvent or a solvent that had been dehydrated by bubbling nitrogen therethrough and had a water content of 10 mass-ppm or less.

Preparation of Resin Binder Solution

A solvent was added to a resin binder in a manner such that a concentration of the resin binder became greater than or equal to 5 mass % and less than or equal to 6 mass %, and the resin binder was dissolved or dispersed in the solvent. Subsequently, a dehydration process was carried out by bubbling nitrogen until the water content of the resin binder solution became less than or equal to 10 mass-ppm.

In Example 1-1, the solvent used for the resin binder solution was mesitylene. The resin binder used was SEBS that is a hydrogenated styrenic thermoplastic elastomer (Tuftec N504, manufactured by Asahi Kasei Corp. ("Tuftec" is a registered trademark)).

Preparation of Solid Electrolyte Composition

In an argon glove box with a dew point of −60° C. or less, mesitylene was added to the LYBC in a manner such that a solids concentration became 35 mass %. The LYBC was wet-milled in a planetary ball mill (P-7 model, manufactured by Fritsch) to disperse the LYBC in the mesitylene. Accordingly, an LYBC dispersion liquid was obtained. A particle diameter (median diameter) of the LYBC was 0.7 μm.

Next, the resin binder solution was added to approximately 20 $cm^3$ of the LYBC dispersion liquid while shear dispersion was performed thereon with a homogenizer (HG-200, manufactured by As One Corporation) and a generator (K-20S, manufactured by As One Corporation). In this manner, a mixed dispersion liquid containing the LYBC and the resin binder was obtained. An amount of the resin binder solution was adjusted in a manner such that a mass ratio of LYBC:SEBS=100:3 was achieved. Furthermore, mesitylene was added to the mixed dispersion liquid in a manner such that a solids concentration became 30 mass %, and thereafter, the mixed dispersion liquid was kneaded under the conditions of 3000 rpm and 10 minutes. One day later, the mixed dispersion liquid was kneaded with a planetary centrifugal mixer (ARE-310, manufactured by Thinky Corporation) under the conditions of 1600 rpm and 3 minutes. In this manner, a solid electrolyte composition of Example 1-1 was obtained.

In the solid electrolyte composition of Example 1-1, the halide solid electrolyte used was LYBC, the solvent used was mesitylene ($\delta p$=0.6), and the resin binder used was SEBS.

The solids concentration of the solid electrolyte composition of Example 1-1 was measured with a heat-drying type moisture analyzer (MX-50, manufactured by A & D Company, Limited). The solids concentration was 32.2 mass %.

Preparation of Solid Electrolyte Sheet

In an argon glove box with a dew point of −60° C. or less, the solid electrolyte composition of Example 1-1 was applied to a copper foil with a metal mask having a thickness of 70 μm and a squeegee. The coated film was dried in a vacuum under the conditions of 100° C. and 1 hour. In this manner, a solid electrolyte sheet of Example 1-1 was obtained.

The polar component $\delta p$ of the HSP of the solvent present in the solid electrolyte composition of Example 1-1 was 0.6.

Example 1-2

A solid electrolyte composition and a solid electrolyte sheet of Example 1-2 were prepared in the same manner as in Example 1-1, except that mixed xylene was used as the solvent in the preparation of the solid electrolyte composition. The mixed xylene was a mixed solvent containing o-xylene, m-xylene, p-xylene, and ethyl benzene in a mass ratio of 24:42:18:16. The solids concentration of the solid electrolyte composition of Example 1-2 was 31.2 mass %. The polar component $\delta p$ of the HSP of the solvent present in the solid electrolyte composition of Example 1-2 was 1.6.

Example 1-3

A solid electrolyte composition and a solid electrolyte sheet of Example 1-3 were prepared in the same manner as in Example 1-1, except that tetralin was used as the solvent in the preparation of the solid electrolyte composition. The solids concentration of the solid electrolyte composition of Example 1-3 was 31.3 mass %. The polar component $\delta p$ of the HSP of the solvent present in the solid electrolyte composition of Example 1-3 was 2.0.

Example 1-4

A solid electrolyte composition and a solid electrolyte sheet of Example 1-4 were prepared in the same manner as in Example 1-1, except that tetralin was used as the solvent in the preparation of the LYBC dispersion liquid that was performed with a planetary ball mill; p-chlorotoluene was used as the solvent in the resin binder solution; and p-chlorotoluene was used as the solvent in the mixing of the LYBC dispersion liquid with the resin binder solution that was performed with a homogenizer. In the solvent present in the solid electrolyte composition of Example 1-4, a ratio between tetralin and p-chlorotoluene on a mass basis was tetralin:p-chlorotoluene=75:25. The solids concentration of the solid electrolyte composition of Example 1-4 was 31.0 mass %. The polar component $\delta p$ of the HSP of the solvent present in the solid electrolyte composition of Example 1-4 was 3.0.

Example 1-5

Preparation of Solid Electrolyte Composition

In an argon glove box with a dew point of −60° C. or less, o-chlorotoluene was added to the LYBC in a manner such that a solids concentration became 35 mass %. The LYBC was wet-milled in a wet grinder/disperser of a bead mill (LMZ015, manufactured by Ashizawa Finetech Ltd.) to disperse the LYBC in a solvent, and, accordingly, an LYBC dispersion liquid was obtained. The particle diameter of the LYBC was 0.4 μm.

Subsequently, a solid electrolyte composition and a solid electrolyte sheet of Example 1-5 were prepared in the same manner as in Example 1-1, except for the following differences: mixed xylene was used as the solvent in the resin binder solution; and mixed xylene was used as the solvent in the mixing of the LYBC dispersion liquid with the resin binder solution that was performed with a homogenizer. The composition of the mixed xylene was as described in Example 1-2. In the solvent present in the solid electrolyte composition of Example 1-5, a ratio between o-chlorotoluene and mixed xylene on a mass basis was o-chlorotoluene: mixed xylene=78:22. The solids concentration of the solid electrolyte composition of Example 1-5 was 30.9 mass %. The polar component δp of the HSP of the solvent present in the solid electrolyte composition of Example 1-5 was 4.0.

Example 1-6

A solid electrolyte composition and a solid electrolyte sheet of Example 1-6 were prepared in the same manner as in Example 1-5, except that p-chlorotoluene was used as the solvent in the preparation of the LYBC dispersion liquid that was performed with a bead mill; toluene was used as the solvent in the resin binder solution; and toluene was used as the solvent in the mixing of the LYBC dispersion liquid with the resin binder solution that was performed with a homogenizer. In the solvent present in the solid electrolyte composition of Example 1-6, a ratio between p-chlorotoluene and toluene on a mass basis was p-chlorotoluene:toluene=74:26. The solids concentration of the solid electrolyte composition of Example 1-6 was 32.5 mass %. The polar component δp of the HSP of the solvent present in the solid electrolyte composition of Example 1-6 was 4.7.

Example 1-7

A solid electrolyte composition and a solid electrolyte sheet of Example 1-7 were prepared in the same manner as in Example 1-5, except that p-chlorotoluene was used as the solvent in the preparation of the LYBC dispersion liquid that was performed with a bead mill; mixed xylene was used as the solvent in the resin binder solution; and mixed xylene was used as the solvent in the mixing of the LYBC dispersion liquid with the resin binder solution that was performed with a homogenizer. In the solvent present in the solid electrolyte composition of Example 1-7, a ratio between p-chlorotoluene and mixed xylene on a mass basis was p-chlorotoluene:mixed xylene=74:26. The solids concentration of the solid electrolyte composition of Example 1-7 was 30.2 mass %. The polar component δp of the HSP of the solvent present in the solid electrolyte composition of Example 1-7 was 4.8.

Example 1-8

A solid electrolyte composition and a solid electrolyte sheet of Example 1-8 were prepared in the same manner as in Example 1-5, except that o-chlorotoluene was used as the solvent in the preparation of the LYBC dispersion liquid that was performed with a bead mill; chlorobenzene was used as the solvent in the resin binder solution; and chlorobenzene was used as the solvent in the mixing of the LYBC dispersion liquid with the resin binder solution that was performed with a homogenizer. In the solvent present in the solid electrolyte composition of Example 1-8, a ratio between o-chlorotoluene and chlorobenzene on a mass basis was o-chlorotoluene:chlorobenzene=78:22. The solids concentration of the solid electrolyte composition of Example 1-8 was 31.5 mass %. The polar component δp of the HSP of the solvent present in the solid electrolyte composition of Example 1-8 was 4.8.

Example 1-9

A solid electrolyte composition and a solid electrolyte sheet of Example 1-9 were prepared in the same manner as in Example 1-5, except that p-chlorotoluene was used as the solvent in the preparation of the LYBC dispersion liquid that was performed with a bead mill; tetralin was used as the solvent in the resin binder solution; and tetralin was used as the solvent in the mixing of the LYBC dispersion liquid with the resin binder solution that was performed with a homogenizer. In the solvent present in the solid electrolyte composition of Example 1-9, a ratio between p-chlorotoluene and tetralin on a mass basis was p-chlorotoluene:tetralin=74:26. The solids concentration of the solid electrolyte composition of Example 1-9 was 31.3 mass %. The polar component δp of the HSP of the solvent present in the solid electrolyte composition of Example 1-9 was 5.0.

Example 1-10

Preparation of Solid Electrolyte Composition

In an argon glove box with a dew point of −60° C. or less, p-chlorotoluene was added to the LYBC in a manner such that a solids concentration became 35 mass %. The LYBC was wet-milled in a wet grinder/disperser of a bead mill to disperse the LYBC in a solvent, and, accordingly, an LYBC dispersion liquid was obtained. The particle diameter of the LYBC was 0.4 μm.

Next, a resin binder solution was added to approximately 200 $cm^3$ of the LYBC dispersion liquid while shear dispersion was performed thereon with a desktop quick homo mixer (LR-1F, manufactured by Mizuho Industrial Co., Ltd.) and an exchange blade (Ultra (236 mm, manufactured by Mizuho Industrial Co., Ltd.). In this manner, a mixed dispersion liquid containing the LYBC and a resin binder was obtained. The amount of the resin binder solution was adjusted in a manner such that a mass ratio of LYBC: SEBS=100:3 was achieved. The solvent of the resin binder solution was tetralin. Furthermore, tetralin was added to the mixed dispersion liquid in a manner such that a solids concentration became 30 mass %, and thereafter, the mixed dispersion liquid was kneaded under the conditions of 1200 rpm and 60 minutes. One day later, the mixed dispersion liquid was kneaded with a planetary centrifugal mixer under the conditions of 1600 rpm and 3 minutes. In this manner, a solid electrolyte composition of Example 1-10 was obtained. A solid electrolyte sheet of Example 1-10 was prepared with the solid electrolyte composition of Example 1-10 in the same manner as in Example 1-1.

In the solvent present in the solid electrolyte composition of Example 1-10, a ratio between p-chlorotoluene and tetralin on a mass basis was p-chlorotoluene:tetralin=76:24. The solids concentration of the solid electrolyte composition of Example 1-10 was 30.8 mass %. The polar component δp of the HSP of the solvent present in the solid electrolyte composition of Example 1-10 was 5.1.

Example 1-11

A solid electrolyte composition and a solid electrolyte sheet of Example 1-11 were prepared in the same manner as in Example 1-5, except that p-chlorotoluene was used as the solvent in the preparation of the LYBC dispersion liquid that was performed with a bead mill; a mixed solvent containing tetralin and p-chlorotoluene in a mass ratio of 45:55 was used as the solvent in the resin binder solution; and no solvent was used in the mixing of the LYBC dispersion liquid with the resin binder solution that was performed with a homogenizer. In the solvent present in the solid electrolyte composition of Example 1-11, a ratio between p-chlorotoluene and tetralin on a mass basis was p-chlorotoluene: tetralin=90:10. The solids concentration of the solid electrolyte composition of Example 1-11 was 31.3 mass %. The polar component δp of the HSP of the solvent present in the solid electrolyte composition of Example 1-11 was 5.7.

Example 1-12

A solid electrolyte composition and a solid electrolyte sheet of Example 1-12 were prepared in the same manner as in Example 1-5, except that p-chlorotoluene was used as the solvent in the preparation of the LYBC dispersion liquid that was performed with a bead mill; anisole was used as the solvent in the resin binder solution; and anisole was used as the solvent in the mixing of the LYBC dispersion liquid with the resin binder solution that was performed with a homogenizer. In the solvent present in the solid electrolyte composition of Example 1-12, a ratio between p-chlorotoluene and anisole on a mass basis was p-chlorotoluene:anisole=76:24. The solids concentration of the solid electrolyte composition of Example 1-12 was 31.2 mass %. The polar component δp of the HSP of the solvent present in the solid electrolyte composition of Example 1-12 was 5.7.

Comparative Example 1-1

A solid electrolyte composition and a solid electrolyte sheet of Comparative Example 1-1 were prepared in the same manner as in Example 1-1, except that heptane was used as the solvent in the preparation of the solid electrolyte composition. The solids concentration of the solid electrolyte composition of Comparative Example 1-1 was 35.8 mass %. The polar component δp of the HSP of the solvent present in the solid electrolyte composition of Comparative Example 1-1 was 0.

Comparative Example 1-2

A solid electrolyte composition and a solid electrolyte sheet of Comparative Example 1-2 were prepared in the same manner as in Example 1-5, except that p-chlorotoluene was used as the solvent in the preparation of the LYBC dispersion liquid that was performed with a bead mill; o-chlorotoluene was used as the solvent in the resin binder solution; and o-chlorotoluene was used as the solvent in the mixing of the LYBC dispersion liquid with the resin binder solution that was performed with a homogenizer. In the solvent present in the solid electrolyte composition of Comparative Example 1-2, a ratio between p-chlorotoluene and o-chlorotoluene on a mass basis was p-chlorotoluene:o-chlorotoluene=74:26. The solids concentration of the solid electrolyte composition of Comparative Example 1-2 was 31.8 mass %. The polar component δp of the HSP of the solvent present in the solid electrolyte composition of Comparative Example 1-2 was 5.9.

Comparative Example 1-3

A solid electrolyte composition and a solid electrolyte sheet of Comparative Example 1-3 were prepared in the same manner as in Example 1-5, except that p-chlorotoluene was used as the solvent in the preparation of the solid electrolyte composition. The solids concentration of the solid electrolyte composition of Comparative Example 1-3 was 32.2 mass %. The polar component δp of the HSP of the solvent present in the solid electrolyte composition of Comparative Example 1-3 was 6.2.

Comparative Example 1-4

A solid electrolyte composition and a solid electrolyte sheet of Comparative Example 1-4 were prepared in the same manner as in Example 1-5, except that p-chlorotoluene was used as the solvent in the preparation of the LYBC dispersion liquid that was performed with a bead mill; o-dichlorobenzene was used as the solvent in the resin binder solution; and o-dichlorobenzene was used as the solvent in the mixing of the LYBC dispersion liquid with the resin binder solution that was performed with a homogenizer. In the solvent present in the solid electrolyte composition of Comparative Example 1-4, a ratio between p-chlorotoluene and o-dichlorobenzene on a mass basis was p-chlorotoluene:o-dichlorobenzene=76:24. The solids concentration of the solid electrolyte composition of Comparative Example 1-4 was 32.0 mass %. The polar component δp of the HSP of the solvent present in the solid electrolyte composition of Comparative Example 1-4 was 6.2.

Comparative Example 1-5

A solid electrolyte composition and a solid electrolyte sheet of Comparative Example 1-5 were prepared in the same manner as in Example 1-5, except that p-chlorotoluene was used as the solvent in the preparation of the LYBC dispersion liquid that was performed with a bead mill; 3,4-dichlorotoluene was used as the solvent in the resin binder solution; and 3,4-dichlorotoluene was used as the solvent in the mixing of the LYBC dispersion liquid with the resin binder solution that was performed with a homogenizer. In the solvent present in the solid electrolyte composition of Comparative Example 1-5, a ratio between p-chlorotoluene and 3,4-dichlorotoluene on a mass basis was p-chlorotoluene:3,4-dichlorotoluene=74:26. The solids concentration of the solid electrolyte composition of Comparative Example 1-5 was 31.9 mass %. The polar component δp of the HSP of the solvent present in the solid electrolyte composition of Comparative Example 1-5 was 7.0.

Reference Example 1-1

Preparation of Solid Electrolyte Composition

In an argon glove box with a dew point of −60° C. or less, p-chlorotoluene was added to a sulfide solid electrolyte $Li_2S—P_2S_5$ (hereinafter referred to as "LPS") in a manner such that a solids concentration became 35 mass %. Next, the LPS was dispersed in the p-chlorotoluene with a homogenizer (HG-200, manufactured by As One Corporation) and a generator (K-20S, manufactured by As One Corporation). In this manner, an LPS dispersion liquid was obtained.

Next, a resin binder solution was added to approximately 20 $cm^3$ of the LPS dispersion liquid while shear dispersion was performed thereon with a homogenizer. In this manner, a mixed dispersion liquid containing the LPS and a resin binder was obtained. The amount of the resin binder solution was adjusted in a manner such that a mass ratio of LPS: SEBS=100:3 was achieved. The solvent of the resin binder solution was tetralin. Furthermore, tetralin was added to the mixed dispersion liquid in a manner such that a solids concentration became 30 mass %, and thereafter, the mixed dispersion liquid was kneaded under the conditions of 3000 rpm and 10 minutes. One day later, the mixed dispersion liquid was kneaded with a planetary centrifugal mixer under the conditions of 1600 rpm and 3 minutes. In this manner, a solid electrolyte composition of Reference Example 1-1 was obtained. A solid electrolyte sheet of Reference Example 1-1 was prepared with the solid electrolyte composition of Reference Example 1-1 in the same manner as in Example 1-1.

In the solvent present in the solid electrolyte composition of Reference Example 1-1, a ratio between p-chlorotoluene and tetralin on a mass basis was p-chlorotoluene:tetralin=80:20. The polar component δp of the HSP of the solvent present in the solid electrolyte composition of Reference Example 1-1 was 5.3.

Reference Example 1-2

A solid electrolyte composition and a solid electrolyte sheet of Reference Example 1-2 were prepared in the same manner as in Reference Example 1-1, except that p-chlorotoluene was used as the solvent in the preparation of the solid electrolyte composition. The polar component δp of the HSP of the solvent present in the solid electrolyte composition of Reference Example 1-2 was 6.2.

Evaluations of Solid Electrolyte Composition

Rheological Measurements

Rheological measurements were performed on the solid electrolyte compositions of Examples 1-1 to 1-11, Comparative Examples 1-1 to 1-5, and Reference Examples 1-1 and 1-2 under the following conditions.

The rheological measurements of the solid electrolyte compositions were performed in a dry room with a dew point of −40 or less. A viscosity/viscoelasticity measuring device (Haake Mars 40, manufactured by Thermo Fisher Scientific Inc.) and a cone/plate having a diameter of 35 mm and an angle of 2° (C35/2° Ti, manufactured by Thermo Fisher Scientific Inc.) were used for the measurements. Viscosities were measured at 25° C. in a rate controlled mode (CR) over a range of shear rates of 0.1/s to 1000/s, to obtain viscosities at shear rates of 1/s and 1000/s. Strains γ were measured at 25° C. in a stress controlled mode (CS) over a range of shear stresses of 0.1 Pa to 200 Pa, and the yield stress was determined by using the method described above. Storage moduli G' and loss tangents tan δ were measured at 25° C. and a frequency of 1 Hz in a strain controlled mode (CD) over a range of strains of 0.01% to 10,000%, to obtain storage moduli G' and loss tangents tan δ at strains of 10% to 25%.

Evaluations of Solid Electrolyte Sheet

Surface Roughness Measurements

Surface roughness of the solid electrolyte sheets of Examples 1-1 to 1-11, Comparative Examples 1-1 to 1-5, and Reference Examples 1-1 and 1-2 was measured. The measurements were performed in an argon glove box with a dew point of −60° C. or less, with a profile-analyzing laser microscope (VK-X1000, manufactured by Keyence Corporation). An image of a surface of the solid electrolyte sheet was acquired at an objective lens magnification of 50×, and by analyzing the image, the arithmetic mean height Sa and the maximum height Sz were determined.

The results of the above measurements are shown in Table 1.

TABLE 1

| | | | Rheological properties of solid electrolyte composition | | | | | | Characteristics of solid electrolyte sheet | |
|---|---|---|---|---|---|---|---|---|---|---|
| | | | Viscosity | | | | | | Surface roughness | |
| | | | | | | | Dynamic viscoelasticity | | | |
| | Solid electrolyte | Polar component δp of HSP of solvent | Shear rate condition: 1/s [Pa · s] | Shear rate condition: 1000/s [mPa · s] | Yield stress [Pa] | Strain γ [%] | Storage modulus G' [Pa] | Loss tangent tanδ | Arithmetic mean height Sa [μm] | Maximum height Sz [μm] |
| Example 1-1 | LYBC | 0.6 | 6.1 | 22.1 | 10.2 | 13.4 | 14.5 | 1.60 | 0.30 | 4.6 |
| Example 1-2 | LYBC | 1.6 | 5.3 | 24.1 | 10.2 | 16.5 | 16.5 | 2.28 | 0.30 | 4.3 |
| Example 1-3 | LYBC | 2.0 | 11.4 | 55.8 | 17.7 | 16.9 | 23.0 | 2.22 | 0.33 | 4.5 |
| Example 1-4 | LYBC | 3.0 | 12.3 | 56.2 | 22.0 | 14.4 | 32.4 | 2.99 | 0.25 | 3.5 |
| Example 1-5 | LYBC | 4.0 | 3.5 | 22.5 | 5.2 | 16.3 | 8.3 | 1.74 | 0.33 | 4.2 |
| Example 1-6 | LYBC | 4.7 | 8.1 | 36.3 | 17.4 | 13.9 | 27.7 | 1.51 | 0.23 | 4.5 |
| Example 1-7 | LYBC | 4.8 | 5.6 | 22.6 | 6.2 | 18.3 | 10.9 | 1.37 | 0.35 | 4.8 |
| Example 1-8 | LYBC | 4.8 | 10.3 | 46.9 | 5.4 | 14.4 | 2.5 | 0.96 | 0.30 | 3.9 |
| Example 1-9 | LYBC | 5.0 | 5.6 | 27.9 | 3.9 | 15.0 | 8.7 | 1.73 | 0.34 | 4.3 |
| Example 1-10 | LYBC | 5.1 | 4.7 | 29.1 | 5.2 | 16.1 | 10.3 | 1.69 | 0.37 | 5.0 |
| Example 1-11 | LYBC | 5.7 | 5.5 | 29.6 | 7.5 | 16.5 | 13.2 | 2.47 | 0.36 | 6.1 |
| Example 1-12 | LYBC | 5.7 | 16.3 | 142.5 | 16.2 | 14.6 | 28.8 | 18.3 | 0.38 | 4.4 |
| Comparative Example 1-1 | LYBC | 0 | 43.8 | 7.6 | 76.4 | 19.0 | 443.0 | 1.27 | 1.81 | 29.9 |
| Comparative Example 1-2 | LYBC | 5.9 | 173.8 | 94.4 | 38.4 | 15.0 | 82.0 | 0.26 | 0.63 | 9.6 |
| Comparative Example 1-3 | LYBC | 6.2 | 137.3 | 85.6 | 45.2 | 18.1 | 79.5 | 0.32 | 1.04 | 11.1 |
| Comparative Example 1-4 | LYBC | 6.2 | 18.1 | 41.5 | 25.3 | 14.3 | 47.8 | 0.19 | 0.47 | 7.3 |

TABLE 1-continued

| | Solid electrolyte | Polar component δp of HSP of solvent | Rheological properties of solid electrolyte composition: Viscosity: Shear rate condition: 1/s [Pa · s] | Viscosity: Shear rate condition: 1000/s [mPa · s] | Yield stress [Pa] | Dynamic viscoelasticity: Strain γ [%] | Dynamic viscoelasticity: Storage modulus G' [Pa] | Dynamic viscoelasticity: Loss tangent tanδ | Characteristics of solid electrolyte sheet: Surface roughness: Arithmetic mean height Sa [μm] | Surface roughness: Maximum height Sz [μm] |
|---|---|---|---|---|---|---|---|---|---|---|
| Comparative Example 1-5 | LYBC | 7.0 | 258.9 | 61.3 | 36.5 | 14.7 | 68.2 | 0.23 | 0.46 | 7.5 |
| Reference Example 1-1 | LPS | 5.3 | 4.0 | 30.4 | 11.5 | 13.2 | 12.4 | 2.13 | 0.89 | 9.5 |
| Reference Example 1-2 | LPS | 6.2 | 4.7 | 30.2 | 14.9 | 15.2 | 12.5 | 2.24 | 0.89 | 9.3 |

As shown in Table 1, in the instance where LYBC was used as the solid electrolyte, a correlation was observed between the polar component δp of the HSP and the surface roughness of the solid electrolyte sheet. In the instance where a solid electrolyte composition containing a solvent having a polar component δp of the HSP that was greater than 0 and less than 5.9 was used, the solid electrolyte sheet had a low surface roughness and a high surface smoothness. In the instance where a solid electrolyte composition containing a solvent having a polar component δp of the HSP that was greater than or equal to 0.6 and less than or equal to 5.7 was used, the solid electrolyte sheet had a lower surface roughness and a higher surface smoothness.

As can be seen from the results of Reference Examples 1-1 and 1-2, in the instance where LPS was used as the solid electrolyte, the surface roughness of the solid electrolyte sheet was independent of the value of the polar component δp of the HSP of the solvent.

Example 2-1

Preparation of Solid Electrolyte Composition

In an argon glove box with a dew point of −60° C. or less, p-chlorotoluene was added to the LYBC in a manner such that a solids concentration became 35 mass %. The LYBC was wet-milled in a wet grinder/disperser of a bead mill to disperse the LYBC in a solvent, and, accordingly, an LYBC dispersion liquid was obtained. The average particle diameter of the LYBC was 0.4 μm.

A resin binder solution was prepared by mixing a resin binder with a solvent. The solvent used in the resin binder solution was mixed xylene. The mixed xylene was a mixed solvent containing o-xylene, m-xylene, p-xylene, and ethyl benzene in a mass ratio of 24:42:18:16. The resin binder used was SEBS that is a hydrogenated styrenic thermoplastic elastomer (Tuftec N504, manufactured by Asahi Kasei Corp. ("Tuftec" is a registered trademark)).

Next, the resin binder solution was added to approximately 20 $cm^3$ of the LYBC dispersion liquid while shear dispersion was performed thereon with a homogenizer and a generator. In this manner, a mixed dispersion liquid containing the LYBC and the resin binder was obtained. The amount of the resin binder solution was adjusted in a manner such that a mass ratio of LYBC:SEBS=100:3 was achieved. Furthermore, mixed xylene was added to the mixed dispersion liquid in a manner such that a solids concentration became 30 mass %, and thereafter, the mixed dispersion liquid was kneaded under the conditions of 3000 rpm and 10 minutes. One day later, the mixed dispersion liquid was kneaded with a planetary centrifugal mixer under the conditions of 1600 rpm and 3 minutes. In this manner, a solid electrolyte composition of Example 2-1 was obtained.

The solids concentration of the solid electrolyte composition was determined with a heat-drying type moisture analyzer. The solids concentration was 31.2 mass %. In the solvent present in the solid electrolyte composition of Example 2-1, a ratio between p-chlorotoluene and mixed xylene on a mass basis was p-chlorotoluene:mixed xylene=78:22. The polar component δp of the HSP of the solvent present in the solid electrolyte composition of Example 2-1 was 5.0.

Preparation of Solid Electrolyte Sheet

In an argon glove box with a dew point of −60° C. or less, the solid electrolyte composition of Example 2-1 was applied to a carbon-coated aluminum foil with a four-sided applicator having a gap of 100 μM, to form a coated film. The coated film was dried in a vacuum under the conditions of 100° C. and 1 hour to produce a solid electrolyte sheet of Example 2-1.

Example 2-2

A solid electrolyte composition and a solid electrolyte sheet of Example 2-2 were prepared in the same manner as in Example 2-1, except that SEBS (Tuftec H1053, manufactured by Asahi Kasei Corp. ("Tuftec" is a registered trademark)) was used as the resin binder in the preparation of the solid electrolyte composition. The solids concentration of the solid electrolyte composition of Example 2-2 was 31.1 mass %.

Example 2-3

A solid electrolyte composition and a solid electrolyte sheet of Example 2-3 were prepared in the same manner as in Example 2-1, except that SEPS (Septon 2005, manufactured by Kuraray Co., Ltd. ("Septon" is a registered trademark) was used as the resin binder in the preparation of the solid electrolyte composition. The solids concentration of the solid electrolyte composition of Example 2-3 was 31.2 mass %.

Example 2-4

A solid electrolyte composition and a solid electrolyte sheet of Example 2-4 were prepared in the same manner as in Example 2-1, except that SEEPS (Septon 4099, manufactured by Kuraray Co., Ltd. ("Septon" is a registered trademark) was used as the resin binder in the preparation of the solid electrolyte composition. The solids concentration of the solid electrolyte composition of Example 2-4 was 31.9 mass %.

Example 2-5

A solid electrolyte composition and a solid electrolyte sheet of Example 2-5 were prepared in the same manner as in Example 2-1, except that a mixture containing SEEPS (Septon 4099, manufactured by Kuraray Co., Ltd. ("Septon" is a registered trademark) and PVDF (Kynar 761, manufactured by Arkema Inc. ("Kynar" is a registered trademark)) in a mass ratio of 1:1 was used as the resin binder in the preparation of the solid electrolyte composition. The solids concentration of the solid electrolyte composition of Example 2-5 was 31.2 mass %.

Example 2-6

A solid electrolyte composition and a solid electrolyte sheet of Example 2-6 were prepared in the same manner as in Example 2-1, except that SBR (Tufdene 2100R, manufactured by Asahi Kasei Corp. ("Tufdene" is a registered trademark)) was used as the resin binder in the preparation of the solid electrolyte composition. The solids concentration of the solid electrolyte composition of Example 2-6 was 31.1 mass %.

Evaluations of Solid Electrolyte Sheet

Ionic Conductivity Measurement

Ionic conductivity of the solid electrolyte sheets of Examples 2-1 to 2-6 were measured in the following manner.

In an argon glove box with a dew point of −60° C. or less, the solid electrolyte sheet, together with the substrate, was multilayer body was vacuum sealed within an aluminum laminate film to produce a sample for an ionic conductivity measurement.

Subsequently, a metal sheet, a silicon rubber sheet, the sample, a silicon rubber sheet, and a metal sheet were arranged in this order, and these were tightened with four bolts (M6) with a torque of 1 N·m to restrain the sample. The resultant was placed in a constant-temperature chamber at 25° C. The ionic conductivity of each of the samples was determined by using an electrochemical AC impedance method, with a potentiostat/galvanostat (1470E, manufactured by Solartron Analytical) and a frequency response analyzer (1255B, manufactured by Solartron Analytical).

Rheological Measurements

Rheological measurements were performed on the solid electrolyte sheets of Examples 2-1 to 2-6 with the methods described above.

Surface Roughness Measurements

Surface roughness of the solid electrolyte sheets of Examples 2-1 to 2-6 was measured with the method described above.

The results of the above measurements are shown in Table 2. The types of resin binders A to F in Table 2 correspond to the resins listed below.

A: a hydrogenated styrenic thermoplastic elastomer (SEBS), Tuftec N504

B: a hydrogenated styrenic thermoplastic elastomer (SEBS), Tuftec H1053

C: a hydrogenated styrenic thermoplastic elastomer (SEPS), Septon 2005

D: a hydrogenated styrenic thermoplastic elastomer (SEEPS), Septon 4099

E: a mixture containing a hydrogenated styrenic thermoplastic elastomer (SEEPS), Septon 4099, and polyvinylidene fluoride (PVDF), Kynar 761, in a mass ratio of 1:1

F: a solution polymerized styrene-butadiene rubber (SBR), Tufdene 2100R

TABLE 2

| | | | Rheological properties of solid electrolyte composition | | | | | | Characteristics of solid electrolyte sheet | |
|---|---|---|---|---|---|---|---|---|---|---|
| | | | Viscosity | | | Dynamic viscoelasticity | | | Surface roughness | |
| | Polar component δp of HSP of solvent | Resin binder | Shear rate condition: 1/s [Pa · s] | Shear rate condition: 1000/s [mPa · s] | Yield stress [Pa] | Strain γ [%] | Storage modulus G' [Pa] | Loss tangent tanδ | Arithmetic mean height Sa [μm] | Ionic conductivity [mS/cm] |
| Example 2-1 | 5.0 | A | 4.3 | 23.8 | 5.8 | 22.9 | 5.3 | 2.30 | 0.36 | 0.23 |
| Example 2-2 | 5.0 | B | 2.4 | 13.3 | 4.0 | 14.0 | 7.3 | 2.30 | 0.36 | 0.25 |
| Example 2-3 | 5.0 | C | 3.9 | 24.4 | 4.8 | 18.2 | 7.8 | 2.58 | 0.28 | 0.31 |
| Example 2-4 | 5.0 | D | 6.0 | 45.3 | 9.2 | 19.2 | 9.8 | 1.77 | 0.32 | 0.31 |
| Example 2-5 | 5.0 | E | 4.4 | 21.6 | 7.5 | 13.6 | 15.4 | 1.62 | 0.28 | 0.14 |
| Example 2-6 | 5.0 | F | 5.2 | 33.8 | 3.8 | 15.4 | 5.0 | 0.80 | 0.38 | 0.34 |

punched with a 20 mm×20 mm square punch. Subsequently, a multilayer body was produced by stacking layers of the substrate, the solid electrolyte sheet, the solid electrolyte sheet, the substrate, and a silicone rubber film in this order in a die. The multilayer body was pressure-molded at 100° C. at a pressure of 620 MPa. The silicone rubber film was removed, and peripheral edge portions of the multilayer body were removed with a guillotine cutter. A copper foil with a tab lead was attached to each of the substrates. The As shown in Table 2, in the instance where a solid electrolyte sheet was manufactured from a solid electrolyte composition containing a solvent having a polar component δp value of the HSP that was greater than 0 and less than 5.9 or a solvent having a polar component δp value of the HSP that was greater than or equal to 0.6 and less than or equal to 5.7 and containing a resin binder made of an elastomer containing repeating units derived from styrene, the solid electrolyte sheet had a low surface roughness and a high surface smoothness. All of the solid electrolyte sheets of Examples 2-1 to 2-6 exhibited a high ionic conductivity of greater than or equal to 0.1 mS/cm.

Example 3-1

Preparation of Solid Electrolyte Sheet

In an argon glove box with a dew point of −60° C. or less, the solid electrolyte composition of Example 1-9 was applied to a polyimide film with a four-sided applicator having a gap of 100 μm, to form a coated film. The coated film was dried in a vacuum under the conditions of 100° C. and 1 hour to produce a solid electrolyte sheet of Example 3-1. The solid electrolyte sheet of Example 3-1 had a thickness of 8 μm after application of pressure.

Preparation of Battery

A negative electrode mixture containing graphite, LPS, and SEBS was applied to a copper foil and dried. In this manner, a negative electrode having a thickness of 90 μm after application of pressure was obtained.

A positive electrode mixture containing Li(Ni, Co, Mn)$O_2$, LPS, and SEBS was applied to a copper foil and dried. In this manner, a positive electrode having a thickness of 55 μm after application of pressure was obtained.

In an argon glove box with a dew point of −60° C. or less, the solid electrolyte sheet, together with the substrate, was punched with a 20 mm×20 mm square punch. Subsequently, a multilayer body was produced by stacking layers of the negative electrode, a sulfide solid electrolyte (LPS, a thickness of 15 μm after application of pressure), the solid electrolyte sheet, the substrate, and a silicone rubber film in this order in a die. The multilayer body was placed under a pressure of 150 MPa at 100° C. to transfer the solid electrolyte sheet onto the negative electrode. The substrate and the silicone rubber film were removed from the multilayer body, and subsequently, a power generating element was produced by stacking layers of the multilayer body including the negative electrode and the solid electrolyte sheet, the positive electrode, and a silicone rubber film in this order in a die. The power generating element was pressure-molded at 100° C. at a pressure of 620 MPa. The silicone rubber film was removed, and a thickness of the power generating element was measured with a micrometer. The result was that the thickness of the power generating element of Example 3-1 was 190 μm. Subsequently, peripheral edge portions of the power generating element were removed with a guillotine cutter. A copper foil with a tab lead was attached to the negative electrode and the positive electrode. The power generating element was vacuum sealed within a container made of an aluminum laminate film, to produce a battery of Example 3-1.

Example 3-2

Preparation of Solid Electrolyte Sheet

In an argon glove box with a dew point of −60° C. or less, the solid electrolyte composition of Example 1-10 was applied to a positive electrode with a die coater to form a coated film. The coated film was hot-air-dried at a temperature of 80° C. to 110° C. to produce a solid electrolyte sheet of Example 3-2. The solid electrolyte sheet of Example 3-2 had a thickness of 6 μm after application of pressure.

Preparation of Battery

In an argon glove box with a dew point of −60° C. or less, the solid electrolyte sheet, together with the positive electrode, was punched with a 20 mm×20 mm square punch. Subsequently, a power generating element was produced by stacking layers of the negative electrode, a sulfide solid electrolyte (LPS, a thickness of 15 μm after application of pressure), the solid electrolyte sheet, the positive electrode, and a silicone rubber film in this order in a die. The power generating element was pressure-molded at 100° C. at a pressure of 620 MPa. The silicone rubber film was removed, and a thickness of the power generating element was measured with a micrometer. The result was that the thickness of the power generating element of Example 3-2 was 186 μm. Subsequently, peripheral edge portions of the power generating element were removed with a guillotine cutter. A copper foil with a tab lead was attached to the negative electrode and the positive electrode. The power generating element was vacuum sealed within a container made of an aluminum laminate film, to produce a battery of Example 3-2.

Example 3-3

Preparation of Solid Electrolyte Sheet

A negative electrode mixture containing graphite, LPS, and SEBS was applied to a copper foil and dried. In this manner, a negative electrode having a thickness of 90 μm after application of pressure was obtained. A multilayer body was produced by stacking a layer of a sulfide solid electrolyte (LPS) on the negative electrode such that the layer had a thickness of 15 μm after application of pressure.

In an argon glove box with a dew point of −60° C. or less, the solid electrolyte composition of Example 1-10 was applied to the multilayer body with a die coater to form a coated film. The coated film was hot-air-dried at a temperature of 80° C. to 110° C. to produce a solid electrolyte sheet of Example 3-3. The solid electrolyte sheet of Example 3-3 had a thickness of 5 μm after application of pressure.

Preparation of Battery

A positive electrode mixture containing Li(Ni, Co, Mn)$O_2$, LPS, and SEBS was applied to a copper foil and dried. In this manner, a positive electrode having a thickness of 55 μm after application of pressure was obtained.

In an argon glove box with a dew point of −60° C. or less, the solid electrolyte sheet, together with the negative electrode, was punched with a 20 mm×20 mm square punch. Subsequently, a power generating element was produced by stacking layers of the multilayer body including the negative electrode, the sulfide solid electrolyte, and the solid electrolyte sheet, the positive electrode, and a silicone rubber film in this order in a die. The power generating element was pressure-molded at 100° C. at a pressure of 620 MPa. The silicone rubber film was removed, and a thickness of the battery was measured with a micrometer. The result was that the thickness of the power generating element of Example 3-3 was 184 μm. Subsequently, peripheral edge portions of the power generating element were removed with a guillotine cutter. A copper foil with a tab lead was attached to the negative electrode and the positive electrode. The power generating element was vacuum sealed within a container made of an aluminum laminate film, to produce a battery of Example 3-3.

Comparative Example 3-1

A solid electrolyte sheet and a battery of Comparative Example 3-1 were manufactured in the same manner as in Example 3-1, except that the solid electrolyte composition of Comparative Example 1-3 was used as the solid electrolyte composition in the preparation of the solid electrolyte sheet. The battery of Comparative Example 3-1 had a thickness of 299 μm. The solid electrolyte sheet of Comparative Example 3-1 had a thickness of 90 μm after application of pressure.

Evaluations of Battery

Charge-Discharge Test

A charge-discharge test was performed on the batteries of Examples 3-1 to 3-3 and Comparative Example 3-1 under the following conditions.

A metal sheet, a silicon rubber sheet, the battery, a silicon rubber sheet, and a metal sheet were arranged in this order, and these were tightened with four bolts (M6) with a torque of 1 N·m to restrain the battery. The resultant was placed in a constant-temperature chamber at 25° C. Subsequently, the battery was charged to a voltage of 4.2 V at a current density corresponding to a current value of 0.05 C with respect to the theoretical capacity of the positive electrode active material (Li(Ni, Co, Mn)$O_2$). Subsequently, the battery was discharged to a voltage of 2.5 V at the current density corresponding to the current value of 0.05 C. Next, the battery was charged to a voltage of 4.2 V at the current density corresponding to the current value of 0.05 C. Subsequently, the battery was discharged to a voltage of 2.5 V at a current density corresponding to a current value of 0.3 C. From these measurements, a 0.3 C discharge capacity [Ah/$cm^2$], a 0.3 C average discharge voltage [V], and an energy density of each of the batteries were obtained. The energy density was determined according to the following equation.

Energy density=1000×(0.3 C discharge capacity×0.3 C average discharge voltage)/(thickness [cm] of battery)

Surface Roughness Measurements

Surface roughness of the solid electrolyte sheets of Examples 3-1 to 3.3 and Comparative Example 3-1 was measured with the method described above.

The results of the above measurements are shown in Table 3.

Comparative Example 3-1 had a low energy density and a low 0.3 C discharge capacity.

According to a comparison between Examples 3-1 to 3-3, all of the Examples 3-1 to 3-3 had good results although the application methods and the substrates used in the preparation of the solid electrolyte sheet differed from one another. This demonstrates that the effects of the technology of the present disclosure can be produced independently of the application method and the type of the substrate.

A reason for the thickness of 90 μm of the solid electrolyte sheet of Comparative Example 3-1 is as follows. In Comparative Example 3-1, the use of the solid electrolyte composition containing a solvent having a high polar component δp of the HSP (Comparative Example 1-3) made it difficult to prepare a thin solid electrolyte sheet.

The solid electrolyte composition of the present disclosure can be used, for example, in the manufacture of all-solid-state lithium ion secondary batteries.

What is claimed is:

1. A solid electrolyte composition comprising:

a solvent; and a solid electrolyte dispersed in the solvent, the solid electrolyte including a halide solid electrolyte, wherein the solvent has a polar component δp of Hansen solubility parameters that is greater than 0 and less than 5.9, the halide solid electrolyte consists of a composition formula (1) below, $$Li_{\alpha}M1_{\beta}X1_{\gamma} \quad \text{formula (1)}$$

where α, β, and γ are each independently a value greater than 0,

M1 is Y and at least one element selected from the group consisting of B, Si, Ge, As, Sb, Te and metal elements other than Li or Y, and X1 is at least one selected from the group consisting of F and I, or X1 consists of Cl and Br, or X1 is at least one selected from the group consisting of F and I and at least one selected from the group consisting of Cl and Br.

TABLE 3

| | Polar component δp of HSP of solvent | Preparation of solid electrolyte sheet: Application method | Electrode or substrate | Surface roughness Arithmetic mean height Sa [μm] | Characteristics of battery: Thickness [μm] | Thickness of solid electrolyte sheet [μm] | 0.3 C discharge capacity [mAh/g] | 0.3 C average discharge voltage [V] | Energy density [Wh/L] |
|---|---|---|---|---|---|---|---|---|---|
| Example 3-1 | 5.0 | Applicator | Polyimide film | 0.32 | 190 | 8 | 157 | 3.48 | 470 |
| Example 3-2 | 5.1 | Die coater | Positive electrode | 0.36 | 186 | 6 | 170 | 3.49 | 530 |
| Example 3-3 | 5.1 | Die coater | Negative electrode-sulfide solid electrolyte | 0.34 | 184 | 5 | 154 | 3.44 | 480 |
| Comparative Example 3-1 | 6.2 | Applicator | Polyimide film | 1.88 | 299 | 90 | 141 | 3.43 | 270 |

As shown in Table 3, the batteries of Examples 3-1 to 3-3 included a solid electrolyte sheet having a thickness of greater than or equal to 1 μm and less than or equal to 20 μm and, consequently, exhibited a high energy density. The solid electrolyte sheet used in the battery of Comparative Example 3-1 had a thickness of 90 μm. The battery of

2. The solid electrolyte composition according to claim 1, wherein the solvent has a polar component δp of the Hansen solubility parameters that is greater than or equal to 0.6 and less than or equal to 5.7.

3. The solid electrolyte composition according to claim 1, further comprising a resin binder.

4. The solid electrolyte composition according to claim 3, wherein the resin binder includes an elastomer.

5. The solid electrolyte composition according to claim 4, wherein the elastomer includes repeating units derived from styrene.

6. A method for manufacturing a solid electrolyte sheet, the method comprising:

applying the solid electrolyte composition according to claim 1 to an electrode or a substrate to form a coated film; and removing the solvent from the coated film.

7. A method for manufacturing a battery, the battery including a positive electrode, a negative electrode, and an electrolyte layer disposed between the positive electrode and the negative electrode, the method comprising:

providing a solid electrolyte sheet manufactured by the method according to claim 6; and combining the positive electrode with the negative electrode in a manner such that the solid electrolyte sheet is disposed between the positive electrode and the negative electrode to serve as the electrolyte layer.

8. A solid electrolyte sheet comprising:

a halide solid electrolyte; and a resin binder in contact with the halide solid electrolyte, wherein the halide solid electrolyte consists of a composition formula (1) below, $$Li_{\alpha}M1_{\beta}X1_{\gamma} \quad \text{formula (1)}$$

where $\alpha$, $\beta$, and $\gamma$ are each independently a value greater than 0, M1 is Y and at least one element selected from the group consisting of B, Si, Ge, As, Sb, Te and metal elements other than Li or Y, X1 is at least one selected from the group consisting of F and I, or X1 consists of Cl and Br, or X1 is at least one selected from the group consisting of F and I and at least one selected from the group consisting of Cl and Br, the solid electrolyte sheet has a thickness of greater than or equal to 1 μm and less than or equal to 20 μm, and a major surface of the solid electrolyte sheet has an arithmetic mean height Sa of less than or equal to 0.37 μm.

9. A battery comprising:

a positive electrode;

a negative electrode; and an electrolyte layer disposed between the positive electrode and the negative electrode, the electrolyte layer including the solid electrolyte sheet according to claim 8.

10. The solid electrolyte composition according to claim 1, wherein X1 consists of Cl and Br.

11. The solid electrolyte sheet according to claim 8, wherein X1 consists of Cl and Br.

12. The solid electrolyte composition according to claim 1, wherein M1 is Y and at least one element selected from the group consisting of B, Si, Ge, As, Sb, Te, Mg, Ca, Sr, Ba, Zn, Sc, Al, Ga, Bi, Zr, Hf, Ti, Sn, Ta, Gd, and Nb.

13. The solid electrolyte sheet according to claim 8, wherein M1 is Y and at least one element selected from the group consisting of B, Si, Ge, As, Sb, Te, Mg, Ca, Sr, Ba, Zn, Sc, Al, Ga, Bi, Zr, Hf, Ti, Sn, Ta, Gd, and Nb.

* * * * *